United States Patent [19]
Dreyer et al.

[11] Patent Number: 6,045,230
[45] Date of Patent: *Apr. 4, 2000

[54] MODULATING RETROREFLECTIVE ARTICLE

[75] Inventors: John F. Dreyer, North Oaks; Madeleine B. Fleming, Oakdale, both of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/019,108

[22] Filed: Feb. 5, 1998

[51] Int. Cl.$^7$ ............................................. G02B 5/122
[52] U.S. Cl. .................. 359/529; 359/530; 359/539; 359/518; 359/900
[58] Field of Search ...................... 359/515, 516, 359/519, 527, 529, 530, 534–540, 900

[56] References Cited

U.S. PATENT DOCUMENTS

| | | |
|---|---|---|
| 752,429 | 2/1904 | Wadsworth . |
| 1,128,979 | 2/1915 | Hess . |
| 1,475,430 | 11/1923 | Curwen . |
| 1,792,731 | 2/1931 | Craig . |
| 1,987,357 | 1/1935 | Bergen et al. . |
| 2,268,351 | 12/1941 | Tanaka . |
| 2,432,896 | 12/1947 | Hotchner . |
| 3,085,473 | 4/1963 | Bourgeaux et al. . |
| 3,085,474 | 4/1963 | Bourgeaux et al. . |
| 3,712,706 | 1/1973 | Stamm . |
| 3,830,682 | 8/1974 | Rowland . |
| 3,844,635 | 10/1974 | Atkins . |
| 3,926,402 | 12/1975 | Heenan . |
| 3,975,083 | 8/1976 | Rowland . |
| 4,012,115 | 3/1977 | Brown . |
| 4,025,159 | 5/1977 | McGrath . |

(List continued on next page.)

FOREIGN PATENT DOCUMENTS

| | | |
|---|---|---|
| 0 171 252 | 2/1986 | European Pat. Off. . |
| 0 759 448 | 2/1997 | European Pat. Off. . |
| 8324 | 9/1909 | United Kingdom . |
| 423464 | 1/1934 | United Kingdom . |
| 441319 | 7/1934 | United Kingdom . |
| WO 97 19820 | 6/1997 | WIPO . |
| WO 97/41464 | 11/1997 | WIPO . |
| WO 97/41465 | 11/1997 | WIPO . |

*Primary Examiner*—James Phan
*Attorney, Agent, or Firm*—Karl G. Hanson

[57] ABSTRACT

Retroreflective articles provide modulating retroreflection using a front surface that includes at least first and second areas having different transmission characteristics and a back surface that includes retroreflective areas and separation areas. The first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface. In addition, a substantial portion of light incident on the first areas of the front surface at a second angle is transmitted through the first areas on the front surface to the separation areas. Together, the front and back surfaces manipulate light such that the retroreflective articles provide modulating retroreflection of incident light where the modulation or variation can be between, e.g., retroreflection or no retroreflection, retroreflection of different colors, retroreflection at different brightness levels, etc. In other words, when subjected to incident light from a steady light source, relative movement between the retroreflective article and the light source can result in variations or modulation in the retroreflection of light from the light source. When retroreflective articles provide modulating retroreflection, the variations or changes tend to increase the conspicuity of the retroreflective articles.

30 Claims, 14 Drawing Sheets

U.S. PATENT DOCUMENTS

| | | |
|---|---|---|
| 4,349,598 | 9/1982 | White . |
| 4,447,723 | 5/1984 | Neumann . |
| 4,542,449 | 9/1985 | Whitehead . |
| 4,576,850 | 3/1986 | Martens . |
| 4,582,885 | 4/1986 | Barber . |
| 4,588,258 | 5/1986 | Hoopman . |
| 4,634,220 | 1/1987 | Hockert et al. . |
| 4,645,301 | 2/1987 | Orensteen et al. . |
| 4,650,283 | 3/1987 | Orensteen et al. . |
| 4,668,558 | 5/1987 | Barber . |
| 4,688,894 | 8/1987 | Hockert . |
| 4,691,993 | 9/1987 | Porter et al. . |
| 4,708,920 | 11/1987 | Orensteen et al. . |
| 4,714,656 | 12/1987 | Bradshaw et al. . |
| 4,726,134 | 2/1988 | Woltman . |
| 4,895,428 | 1/1990 | Nelson et al. . |
| 4,906,070 | 3/1990 | Cobb, Jr. . |
| 4,938,563 | 7/1990 | Nelson et al. . |
| 4,948,228 | 8/1990 | Keens . |
| 4,983,436 | 1/1991 | Bailey et al. . |
| 5,050,327 | 9/1991 | Woltman . |
| 5,066,098 | 11/1991 | Kult et al. . |
| 5,122,902 | 6/1992 | Benson . |
| 5,237,449 | 8/1993 | Nelson et al. . |
| 5,254,390 | 10/1993 | Lu . |
| 5,272,562 | 12/1993 | Coderre . |
| 5,387,458 | 2/1995 | Pavelka et al. . |
| 5,450,235 | 9/1995 | Smith et al. . |
| 5,471,348 | 11/1995 | Miller et al. . |

MODULATING RETROREFLECTIVE ARTICLE

FIELD OF THE INVENTION

The present invention relates to the field of retroreflective articles that exhibit modulating retroreflection.

BACKGROUND

Nighttime visibility of objects and people is a continuing problem, particularly for the operators of vehicles such as trucks and automobiles. Approaches to increasing their nighttime visibility can be either active or passive. Active systems provide conspicuity by providing a steady light source, flashing light source, or a combination of steady and flashing light sources. Although active systems do provide conspicuity, they must be provided with energy, typically electrical energy, to provide the desired light. Energy sources are not always available or they may be depleted such that the light sources will not operate. As a result, active systems find limited application for providing long term conspicuity.

Passive systems include diffuse reflectors, specular reflectors, and/or retroreflectors. Retroreflectors can return a significant portion of incident light, that would otherwise be reflected elsewhere, back towards a light source, such as the headlights of a car or truck. Retroreflectors are typically constructed of beads (see, e.g., U.S. Pat. Nos. 4,025,159 to McGrath; 4,983,436 to Bailey et al.; and 5,066,098 to Kult et al.) or they can include cube corner elements (see, e.g., U.S. Pat. Nos. 5,272,562 to Coderre and 5,450,235 to Smith et al.). With many retroreflectors, the amount of returned light can make the retroreflective article appear as though it has a light source of its own when, in reality, at least a portion of the light directed at the retroreflector from the light source is merely being returned towards the source. Although retroreflectors return a significant portion of light, the incident light is typically from a steady source such as headlights. Steady incident light yields generally steady returned light from the retroreflectors.

Investigators have made various strides towards improving the conspicuity of retroreflective articles. For example, Shusta et al. in PCT publications WO 97/41465 and 97/41464 (U.S. Pat. application Nos. 08/640,326 and 08/640,383) describes a retroreflective article that glitters when exposed to light. Fluorescent dyes have also been used to improve conspicuity—see for example, U.S. Pat. Nos. 5,387,458 and 3,830,682. Finally, in U.S. Pat. No. 4,726,134, a retroreflective sign has been described which has areas that vary in retroreflectivity to improve the sign's conspicuity.

SUMMARY OF THE INVENTION

The present invention provides an alternative approach to improving conspicuity of retroreflective articles. In accordance with the present invention, a retroreflective articles that provide modulating retroreflection using a front surface that includes at least first and second areas having different transmission characteristics and a back surface that includes retroreflective areas and separation areas. The first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface. In addition, a substantial portion of light incident on the first areas of the front surface at a second angle is transmitted through the first areas on the front surface to the separation areas.

Together, the front and back surfaces manipulate light such that the retroreflective articles provide modulating retroreflection of incident light where the modulation or variation can be between, for example, retroreflection or no retroreflection, retroreflection of different colors, retroreflection at different brightness levels, etc. In other words, when subjected to incident light from a steady light source, relative movement between the retroreflective article and the light source can result in variations or modulation in the retroreflection of light from the light source. When retroreflective articles provide modulating retroreflection, the variations or changes tend to increase the retroreflective article's conspicuity.

In one aspect the present invention provides a retroreflective article having a front surface including a plurality of first areas and a plurality of second areas, wherein the plurality of first areas transmit a different amount of incident light than the plurality of second areas; a back surface opposite the front surface, the back surface including a plurality of retroreflective areas and a plurality of separation areas, wherein the plurality of retroreflective areas are separated from each other by the separation areas; wherein the first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface, and further wherein a substantial portion of light incident on the first areas of the front surface at a second angle is transmitted through the first areas on the front surface to the separation areas.

In another aspect, the present invention provides a retroreflective article having a front surface including a plurality of first areas and a plurality of second areas, wherein the plurality of first areas transmit a different amount of incident light than the plurality of second areas, and further wherein the first and second areas on the front surface are arranged in alternating columns generally aligned with a first axis, and still further wherein, for light incident on the front surface at a first angle, the plurality of first areas are substantially transmissive and each of the plurality of second areas exhibits one or more optical properties selected from the group of: substantially absorptive, partially absorptive, diffusely transmissive, partially transmissive, diffusely reflective, specularly reflective, and retroreflective; a back surface opposite the front surface, the back surface including a plurality of retroreflective areas and a plurality of separation areas, wherein the retroreflective areas and the separation areas are arranged in alternating columns on the back surface, the columns being generally aligned with the first axis and having a width generally transverse to the first axis, and further wherein, for light transmitted through the front surface, each of the plurality of separation areas on the back surface exhibit one or more optical properties selected from the group of absorption, transmission, and retroreflection wherein at least one optical characteristic of light retroreflected from the separation areas is different than light retroreflected from the retroreflective areas on the back surface of the article; and wherein the first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface, and further wherein a substantial portion of light incident on the first areas of the front surface at a second angle is transmitted through the first areas on the front surface to the separation areas.

In still another aspect, the present invention also provides a method of manufacturing a retroreflective article by providing a front surface comprising a plurality of first areas and a plurality of second areas, wherein the plurality of first areas transmit a different amount of incident light than the plurality of second areas; providing a back surface opposite the front surface, the back surface being separated from the front surface by an optically transmissive medium; providing a light curable binder solution on the back surface; providing a plurality of retroreflective beads proximate the back surface, each of the plurality of retroreflective beads at least partially immersed in the binder solution; forming retroreflective areas on the back surface by directing light energy through the front surface to cure selected areas of the binder solution on the back surface, wherein the binder solution in the selected areas is sufficiently cured to retain a substantial portion of the retroreflective beads; and removing the retroreflective beads from the uncured binder solution on the back surface to form separation areas between the retroreflective areas; wherein the first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface, and further wherein a substantial portion of light incident on the first areas of the front surface at a second angle is transmitted through the first areas on the front surface to the separation areas.

These and other features and advantages of the articles and methods according to the present invention are discussed more completely below in connection with illustrative embodiments of the inventions.

BRIEF DESCRIPTION OF THE DRAWINGS

FIGS. 5aa–5cc are schematic representations depicting the appearance of the retroreflective articles of FIGS. 5a–5c under different conditions.

DETAILED DESCRIPTION OF ILLUSTRATIVE EMBODIMENTS OF THE INVENTION

Figure 1:
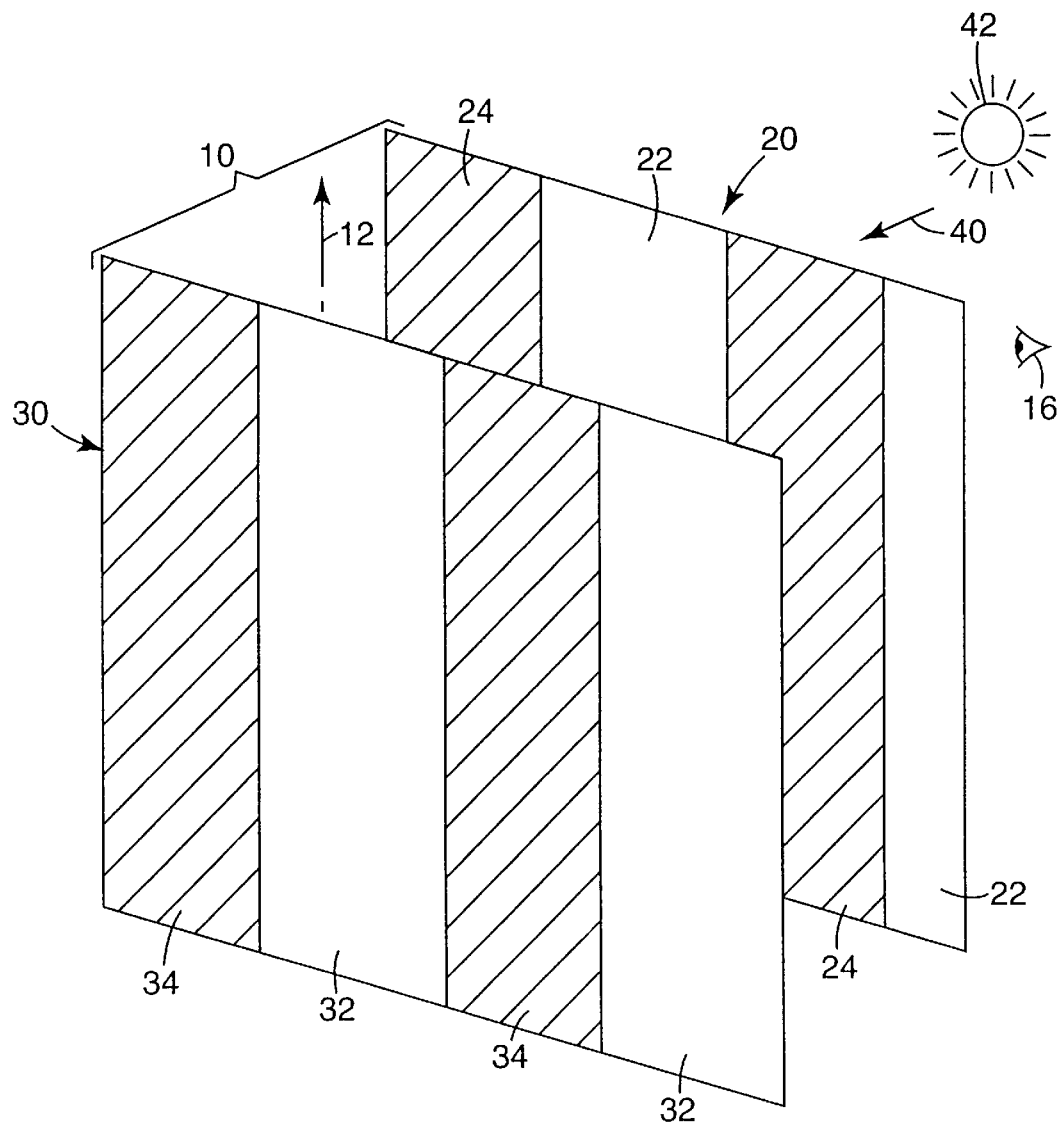
FIG. 1 is a perspective view of one retroreflective article according to the present invention.

The present invention provides retroreflective articles including two optical surfaces that together provide modulating retroreflection of incident light approaching the article during relative movement between a light source and the article. The modulating or varying nature of the retroreflection can take a number of different forms. For example, the variations can result in retroreflection or no reflection (i.e., on/off retroreflection), retroreflection that changes between two or more different colors, variations in brightness or intensity of the retroreflected light, two or more different types of flashing retroreflection (e.g., on/off and different color retroreflection), apparent motion as successive portions of the retroreflective article retroreflect incident light, or the retroreflective article may include retroreflective portions that have different entrance angularity or observation angularity.

The figures used to illustrate the principles of retroreflective articles according to the present invention are not drawn to scale, particularly with respect to the distances between the front and back surfaces in retroreflective articles according to the present invention. Typically, the distance between the front and back surfaces in retroreflective articles according to the present invention will be larger than the dimensions of the structures on the front and back surfaces.

Although substantially all of the light retroreflected by the articles according to the present invention is slightly displaced or translated during retroreflection, these displacements will generally be ignored for the sake of simplicity when describing the inventive retroreflective articles and the articles' effect on light.

The retroreflective articles according to the present invention provide modulating retroreflection with two opposing surfaces, where the front surface includes at least first and second areas that transmit light having one or more different properties and a back surface that includes retroreflective areas and separation areas. Because the back surface includes areas that provide at least two different optical effects, e.g., retroreflective and absorptive, the difference in transmission through the front surface results in articles that provide modulating retroreflection based on the approach angle of incident light.

Furthermore, although the retroreflective articles according to the present invention will be described as having front and back surfaces, it will be understood that the front and/or back surfaces may themselves be embedded within the body of an object, i.e., the front and/or back surfaces may not be exposed on the outer surfaces of an object used to provide the retroreflective articles of the present invention. In addition, the front and back surfaces can be provided in a single, integral body or they could be provided using two or more bodies.

Also, retroreflective articles according to the present invention will tend to work better for light approaching the front surface of the article at a relatively small angle relative to an axis normal to the front surface. Light approaching at large angles off of normal may experience significant reflection at the front surface such that the transmission of light through the surface is significantly reduced. Additionally, even if high angle light is transmitted through the front surface, it may approach the retroreflective areas on the back surface of the article at angles outside of the working range of the retroreflective elements or structures used in the retroreflective areas, thereby resulting in limited or no retroreflection.

Although the first and second areas on the front surfaces and the retroreflective areas and separation areas on the back surfaces of retroreflective articles are generally described as being provided in regular shapes and repeating patterns below, it will be understood that they may instead be provided in irregular shapes and/or non-repeating patterns. Retroreflective articles in which the first and second areas on the front surface and/or the retroreflective areas and separation areas on the back surface are provided in irregular shapes and/or non-repeating patterns will still preferably exhibit modulating retroreflection. In some instances, the retroreflection may appear as sparkling retroreflection, where different areas of the retroreflective articles retroreflect light at different times and in different intensities based on the approach angle of the retroreflected light.

FIG. 1 is a perspective view of one retroreflective article 10 according to the present invention that includes a front surface 20 and a back surface 30 located opposite the front surface 20. Light 40 from light source 42 is incident on front surface 20 of the retroreflective article 10.

Back surface 30 includes a plurality of retroreflective areas 32 that are designed to retroreflect light incident on them from the front surface 20 back towards the front surface 20 of the retroreflective article 10. A separation area 34 is located between each pair of adjacent retroreflective areas 32 on retroreflective article 10.

In a preferred embodiment, the retroreflective areas 32 and the intervening separation areas 34 are columnar in shape, generally aligned with axis 12, and provided in a repeating pattern across the back surface 30. It will, however, be understood that the retroreflective areas 32 and separation areas 34 on the back surface 30 may be provided in irregular shapes and/or in non-repeating patterns.

The separation areas 34 can provide a variety of optical effects. For example, the separation areas 34 may transmit incident light, they may absorb incident light, they may be specularly reflective, diffusely reflective or retroreflective. In addition, the separation areas may exhibit two or more different optical properties, e.g., they may include absorptive and transmissive portions or other combinations.

If at least a portion of each of the separation areas 34 is retroreflective, it is preferred that they exhibit retroreflection that is, in some respect, different from the retroreflection exhibited by the retroreflective areas 32. One example of a difference in retroreflection is a change in the brightness or intensity of the light retroreflected from the separation areas 34 as compared to the light retroreflected from the retroreflective areas 32. Another example of a difference in retroreflection is a change in the color of the light retroreflected from the separation areas 34 as compared to the color of light retroreflected from the retroreflective areas 32. Yet another difference could be in the entrance angularity or observation angularity of the retroreflective structures in the retroreflective areas 32 as compared to the separation areas 34.

The front surface 20 of the retroreflective article 10 includes a plurality of first areas 22 and a plurality of second areas 24. The second areas 24 preferably differ from the first areas 22 in that the second areas 24 transmit light having one or more different properties than the light transmitted by the first areas. The different properties of the transmitted light may include, but are not limited to: intensity, color, wavelength, polarization, etc.

For example, the first areas 22 may be smooth and clear such that they transmit substantially all normally (or near normally) incident light, while the second areas 24 absorb nearly all of the light incident on them, i.e. they transmit substantially no light. In another combination, the first areas 22 may be transmissive, while the second areas 24 are reflective, i.e., they reflect a substantial portion of incident light. In yet another combination, the first areas 22 may transmit light of all polarization orientations while the second areas may be provided with a polarizing film that reflects or absorbs a substantial amount of light having one polarization orientation while transmitting light with the orthogonal polarization orientation. In still another combination, the second areas 24 may be provided with a filter that absorbs light having one particular range of wavelengths while the first areas 22 transmit light having any visible wavelength. In still yet another variation, the first and second areas 22/24 may exhibit different colors such that the retroreflective article 10 exhibits different color retroreflected light based on the approach angle of the light. In some embodiments, the second areas 24 may exhibit one or more optical properties selected from the group of: absorption, diffuse transmission, partial transmission, diffuse reflection, specular reflection, and retroreflection.

In any case, the light transmitted through the second areas 24 to the retroreflective areas 32 on the back surface 30 is different in some respect from the light transmitted through the first areas 22 that is incident on the retroreflective areas 32 of the back surface 30. It is the differences in the light transmitted by the different areas on the front surface 20, when combined with the different retroreflective areas 32 and separation areas 34 on the back surface 30 that provides the modulating retroreflection from retroreflective articles according to the present invention.

The first and second areas 22/24 on the front surface 20 of the retroreflective article 10 are preferably arranged relative to the retroreflective areas 32 and the separation areas 34 on the back surface 30 such that a substantial portion of light incident on the first areas 22 of the front surface 20 at a first angle is transmitted through the first areas 22 of the front surface 20 to the retroreflective areas 32 on the back surface 30 where the light is retroreflected back through the first areas 22 on the front surface 20. For light incident on the front surface 20 of the retroreflective article 10 at a second angle, a substantial portion of the light incident on the first areas 22 of the front surface 20 at the second angle is transmitted through the first areas 22 on the front surface 20 to the separation areas 34 on the back surface 30. Between the first and second angles lies a range of approach angles in which a portion of the light transmitted through the first surfaces 22 is incident on the retroreflective areas 32 and a portion of the light transmitted through the first surfaces 22 is incident on the separation areas 34.

Figure 2:
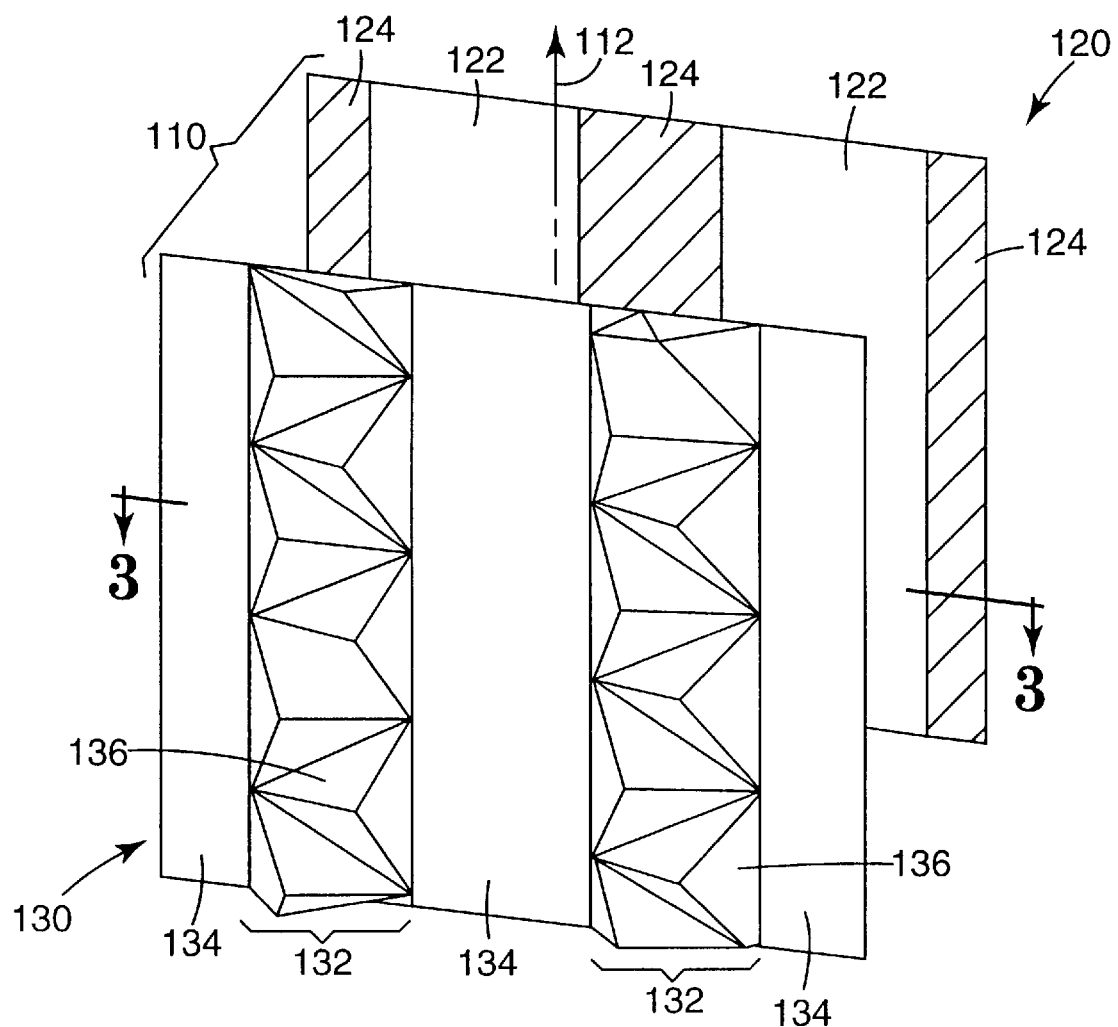
FIG. 2 is a perspective view of an alternative retroreflective article according to the present invention.
Figure 3:
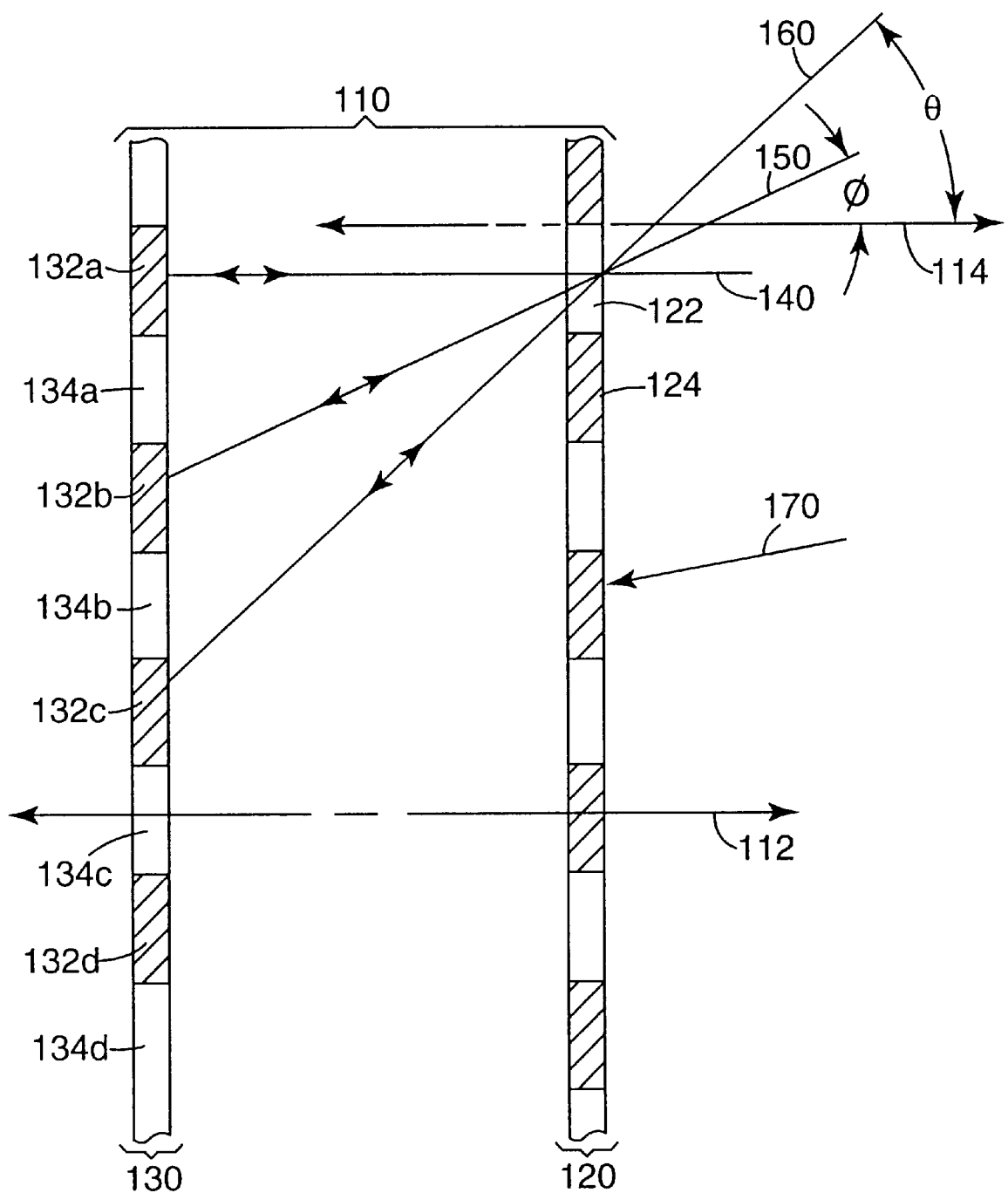
FIG. 3 is a cross-sectional view of the retroreflective article of FIG. 2 taken along line 3—3.

Another embodiment of a retroreflective article according to the present invention is illustrated in FIGS. 2 and 3. The retroreflective article 110 depicted there includes a front surface 120 and a back surface 130. The front surface 120 preferably includes transmissive first areas 122 and second areas 124 that, in this embodiment, absorb substantially all of the light incident on them. The back surface 130 of the retroreflective article 110 includes both retroreflective areas 132a–132d (collectively referred to as retroreflective areas 132), as well as separation areas 134a–134d (collectively referred to as separation areas 134). The retroreflective areas 132 and separation areas 134 are preferably arranged in columns that are generally aligned with the axis 112 (see FIG. 2).

The retroreflective areas 132 preferably include a plurality of retroreflective structures 136. The preferred retroreflective structures 136 are cube corner elements, although the retroreflective areas 132 could include other retroreflective structures including, but not limited to retroreflective beads or spheres, conical retroreflective elements, and essentially any elements capable of retroreflecting light.

The separation areas 134 in the retroreflective article 110 are preferably either transmissive or absorptive, such that light incident on separation areas 134 from the front surface 120 either exits the article 110 or is absorbed. The result of either transmissive or absorptive separation areas 134 is that, for light incident on a transmissive first area 122 on the front surface 120, the retroreflective article 110 would exhibit retroreflection only when the approach angle of the light was such that it was incident on one of the retroreflective areas 132 on the back surface 130. In those instances where the approach angle of the light was such that substantially all of the light was transmitted through the first areas 122 to one of the separation areas 134 on the back surface 130, the article 110 would exhibit no retroreflection. Light incident on the second areas 124 of the front surface would be absorbed with substantially none of the light being transmitted.

FIG. 3 includes a series of rays 140, 150, 160 and 170 to illustrate operation of the invention. It will be understood that refraction of the light passing through the front surface 120 will be ignored for the purposes of the following discussion.

Ray 140 approaches the front surface 120 of the retroreflective article 110 parallel to the normal axis 114. Ray 140 is transmitted through the first area 122 and is incident on retroreflective area 132a on the back surface 130, where it is retroreflected back again.

Ray 150 is incident on the first area 122 of the front surface 120 at an angle $\phi$ with respect to the normal axis 114 where it is transmitted to retroreflective area 132b on the back surface 130. Ray 150 is then retroreflected back through the first area 122 on the front surface 120 of the retroreflective article 110.

Ray 160 is incident on the first area 122 at an angle $\theta$ with the normal axis 114, and is transmitted through the first area 122 towards retroreflective area 132c on the back surface 130, where it is retroreflected back again.

Ray 170 is incident on one of the second areas 124 on the front surface 120 where it is absorbed such that substantially none of the light is retroreflected back along the path it followed when approaching the retroreflective article 110.

For the purposes of the present invention, ray 140 illustrates a "zero order" retroreflection, i.e., retroreflection from the retroreflective area 132a located directly across from the first area 122 along the normal axis 114. Ray 150 illustrates "first order" retroreflection, i.e., retroreflection from a retroreflective area 132b offset by one from the retroreflective area 132a located directly across from the first area 122. Similarly, ray 160 illustrates "second order" retroreflection, i.e., retroreflection from a retroreflective area 132c offset by two from the retroreflective area 132a located directly across from the first area 122. It can be seen that if the approach angles of rays were larger in absolute value (with respect to the normal axis 114), or if the distance between the front and back surfaces 120 and 130 were larger, the light could eventually be transmitted to the reach retroreflective area 132d offset by three from the retroreflective area 132a. Such retroreflection would be referred to herein as "third order" retroreflection. This concept can, of course, be extended to fourth, fifth, sixth and larger order retroreflections subject to a number of variations such as refractive indexes, pitch, distance between the front and back surfaces, etc.

From the above discussion of article 10, it can be seen that as the light was swept through a range of approach angles, the light would be retroreflected at some angles and not retroreflected at other angles and that those conditions would alternate through the range of angles. The end result is that, where the light source and the retroreflective article 110 were moving relative to each other such that the approach angle of the light on the front surface 120 changes, the article 110 would exhibit modulating or flashing retroreflection.

Another variation on the retroreflective article 110 is that shifting the spatial relationship between the areas on the front and back surfaces 120 and 130 will cause a change in the angles at which the retroreflective article 110 will retroreflect light. In the embodiment depicted in FIG. 3, the centers of the retroreflective areas 132 are aligned with the centers of the first areas 122. It will be understood that it would be possible to shift the pattern of retroreflective areas 132 and separation areas 134 on the back surface 130 relative to the first and second areas 122/124 on the front surface and that such a variation would affect the angles at which incident light would be retroreflected or not retroreflected by the retroreflective article 110.

Figure 4:
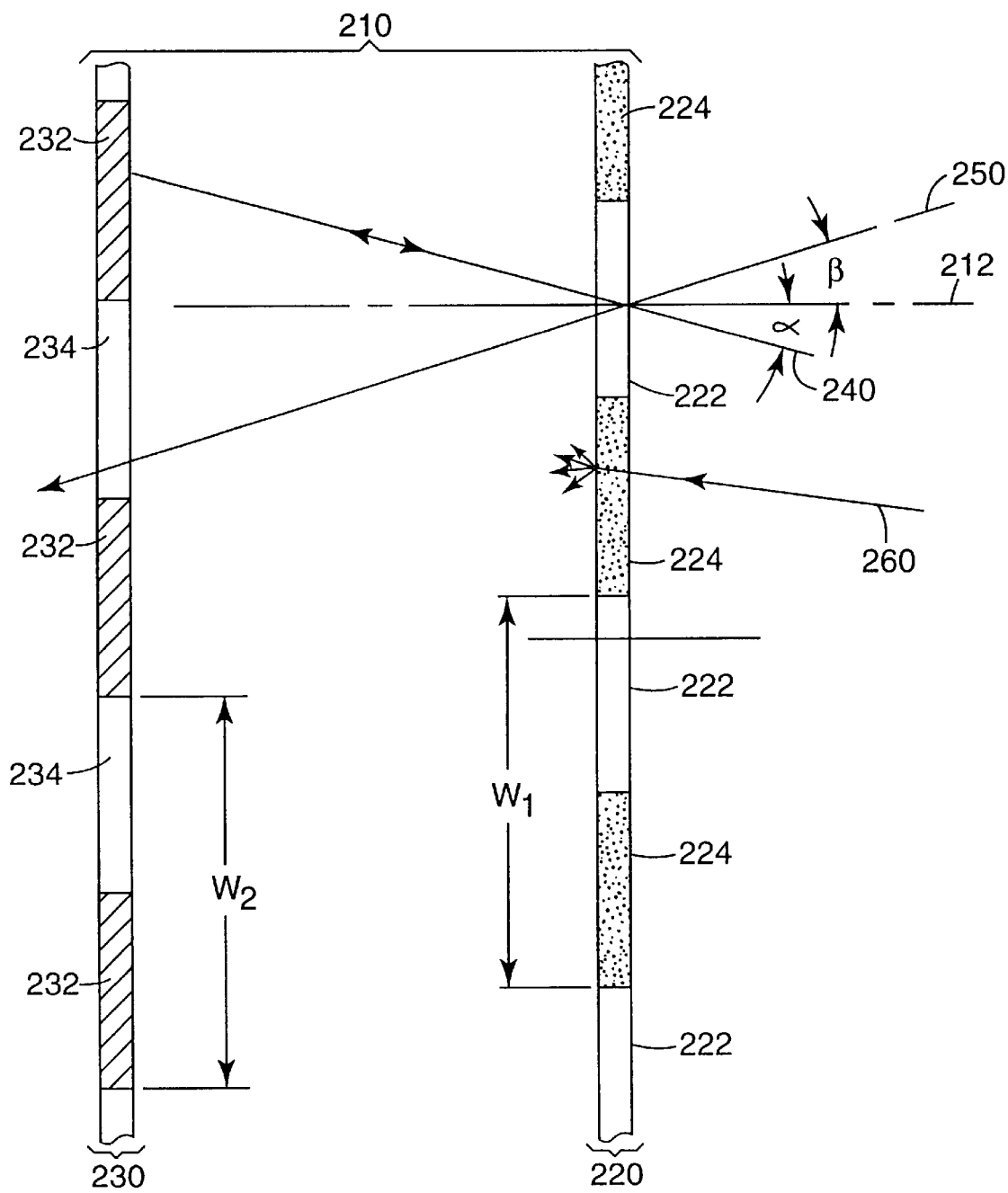
FIG. 4 is a cross-sectional view of another retroreflective article according to the present invention.

FIG. 4 depicts another embodiment of a retroreflective article 210 according to the present invention. The retroreflective article 210 includes a front surface 220 and a back surface 230. The front surface 220 of the article 210 includes first areas 222 and second areas 224. In this embodiment, the first areas 222 specularly transmit a substantial portion of incident light while the second areas 224 diffusely transmit light. The first areas 222 and second areas 224 are preferably generally columnar and provided in a repeating pattern.

The back surface 230 of retroreflective article 210 includes retroreflective areas 232 and separation areas 234. The retroreflective areas 232 and separation areas 234 are preferably arranged in columns that are generally aligned with the axis 212.

The separation areas 234 in the retroreflective article 210 are preferably either transmissive or absorptive, such that light incident on separation areas 234 from the front surface 220 either exits the article 210 or is absorbed. The result of either transmissive or absorptive separation areas 234 is that, for light incident on a transmissive first area 222 on the front surface 220, the retroreflective article 210 would exhibit retroreflection only when the approach angle of the light was such that it was incident on one of the retroreflective areas 232 on the back surface 230. In those instances where the approach angle of the light was such that substantially all of the light was transmitted through the first areas 222 to one of the separation areas 234 on the back surface 230, the article 210 would exhibit no retroreflection.

Light incident on the second areas 224 of the front surface would be transmitted, but only diffusely. As a result, although a portion of that light would be incident on the retroreflective areas 232, that portion would typically be retroreflected back to the diffusely transmissive second area 224, where it would be diffusely transmitted again. The end result is that little, if any, of the light transmitted through the second areas 224 would be retroreflected by the article 210.

FIG. 4 includes rays 240, 250 and 260 to illustrate operation of the retroreflective article 210. It will be understood that refraction of the light passing through the front surface 220 will be ignored for the purposes of the following discussion.

Ray 240 approaches the front surface 220 of the retroreflective article 210 at an angle $\alpha$ with respect to normal axis 214. Ray 240 is transmitted through the first area 222 and is incident on one of the retroreflective areas 232 on the back surface 230, where it is retroreflected back again.

Ray 250 is incident on the first area 222 of the front surface 220 at an angle $\beta$ with respect to the normal axis 214 where it is transmitted to one of the separation areas 234 on the back surface 230. Ray 250 is transmitted through the separation surface 234 as depicted and, thus, is not returned to the front surface 220.

Ray 260 is incident on one of the second areas 224 on the front surface 220 where it is diffusely transmitted such that substantially none of the light is retroreflected back along the path it followed when approaching the retroreflective article 210.

From the above discussion of article 210 and representative light rays, it can be seen that as the light was swept through a range of approach angles, the light would be retroreflected at some angles and not retroreflected at other angles and that those conditions would alternate through the range of angles. The end result is that, where the light source and the retroreflective article 210 were moving relative to each other such that the approach angle of the light on the front surface 220 changes, the article 210 would exhibit modulating or flashing retroreflection.

The retroreflective article 210 of FIG. 4 also exhibits another relationship between the first and second areas 222/224 on the front surface 220 and the retroreflective areas 232 and separation areas 234 on the back surface 230, namely that the retroreflective article 210 exhibits equal pitch between the different areas on the two surfaces. The pitch is represented by the width of the different areas on each of the two surfaces 220 and 230. Each pair of adjacent first and second surfaces 222/224 represents one group on the front surface 220 with a width $\omega_1$ that defines the pitch of the front surface 220. The pitch of the back surface 230 is defined by $w_2$ which includes the width of one of the retroreflective areas 232 combined with the width of an adjacent separation area 234.

It will be understood that, particularly with respect to the front surface 220, the pitch defined by the width of the first and second areas 222/224 should be large enough such that the diffractive effects of such a structure do not dominate the optical characteristics of the retroreflective article 210.

Figure 5A:
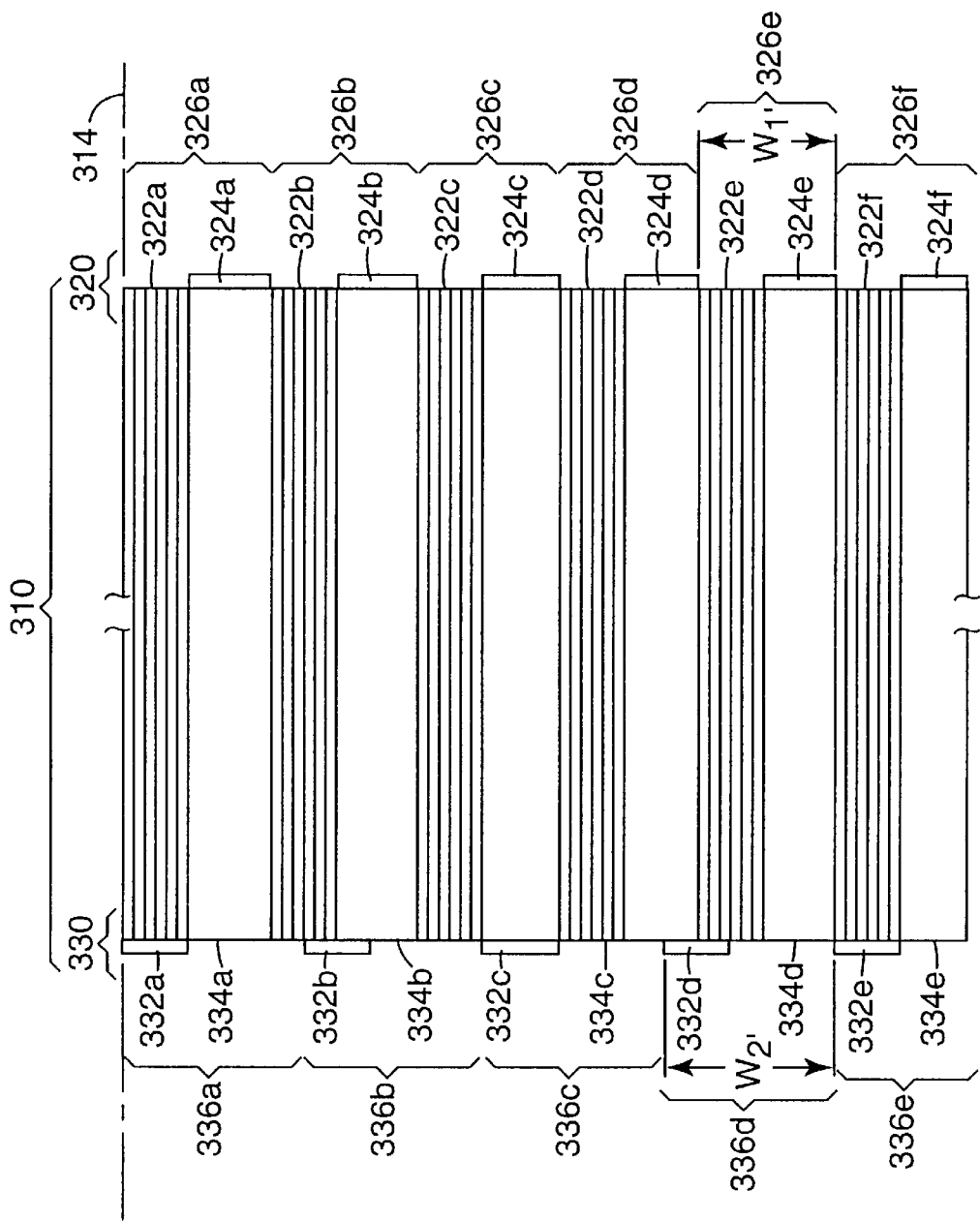
FIGS. 5a–5c are cross-sectional views of another retroreflective article according to the present invention.
Figure 5B:
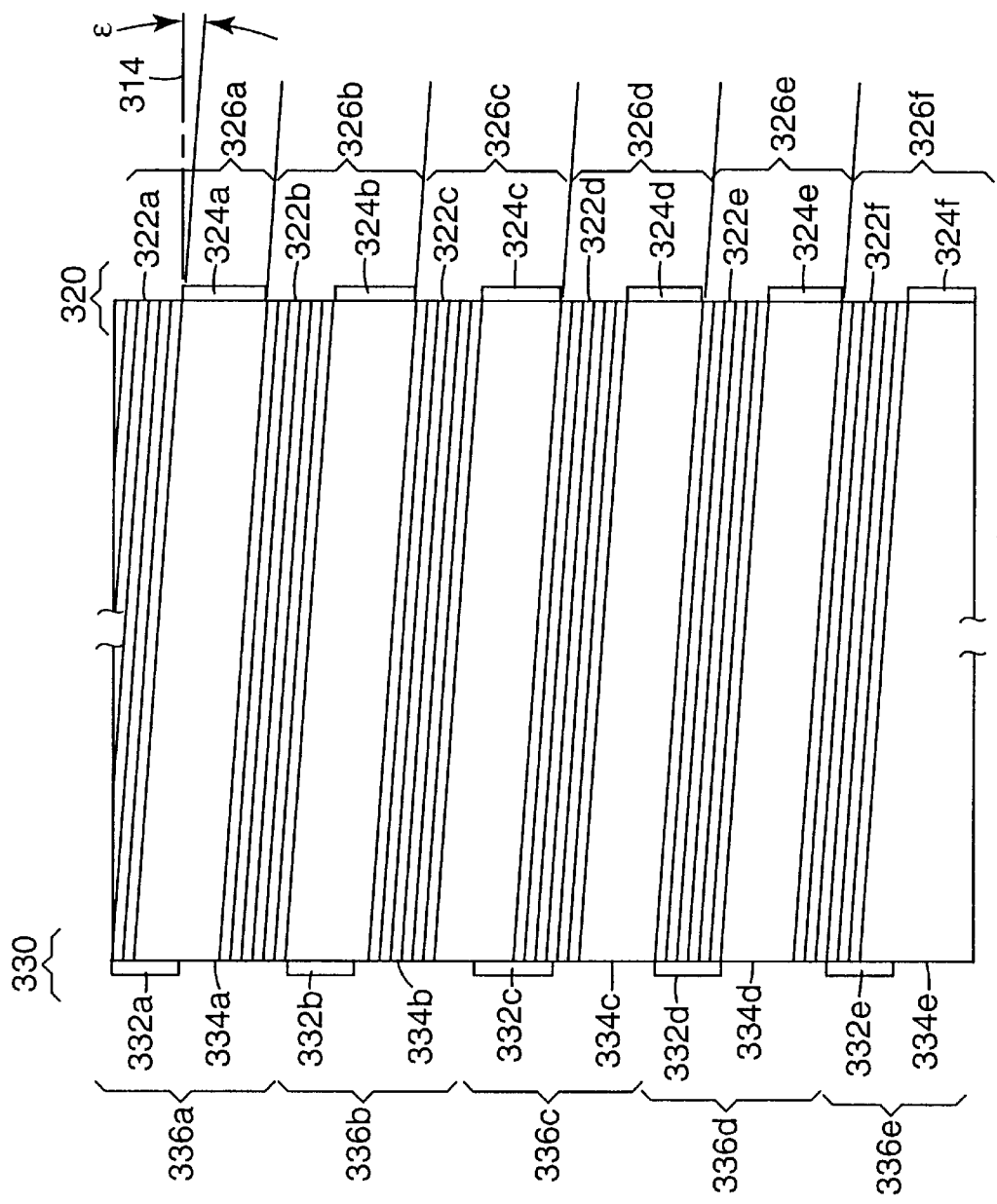
Figure 5C:
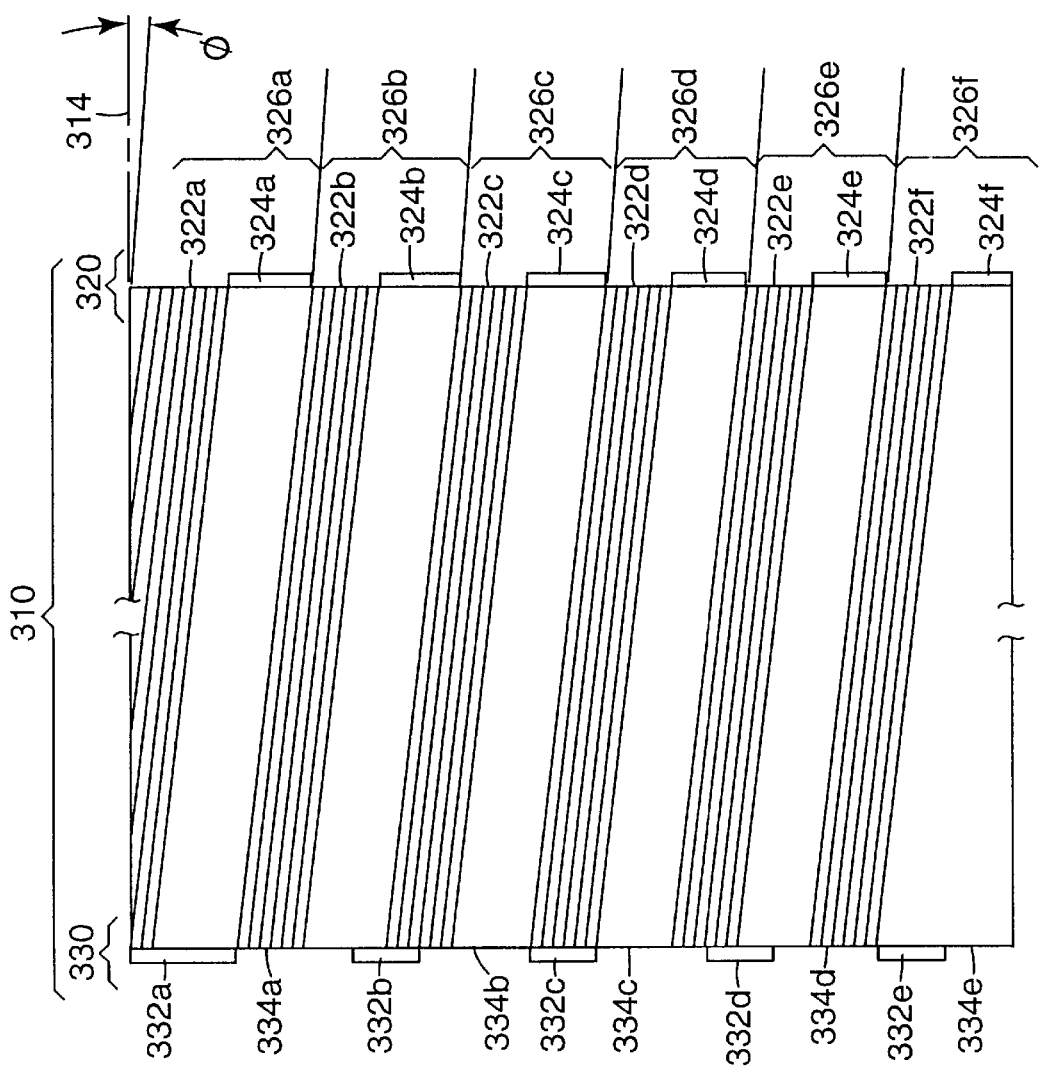
Figure 5A:
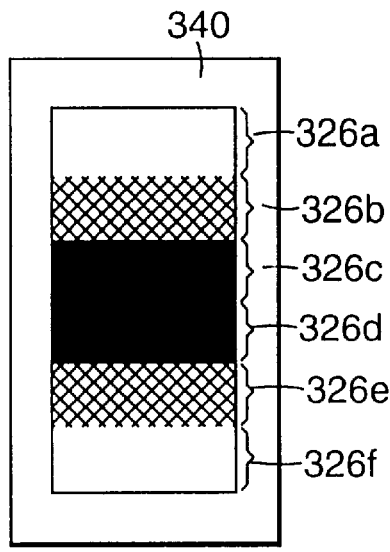
Figure 5B:
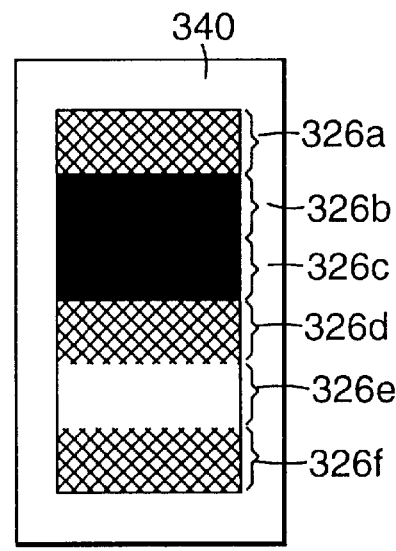
Figure 5C:
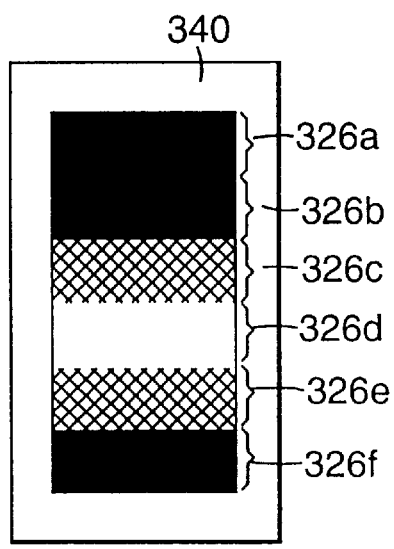

FIGS. 5a–5c illustrate the effects of a difference in pitch between the front surface 320 and back surface 330 for a retroreflective article 310 where $\omega_1'$ is not equal to $\omega_2'$ (see FIG. 5a). FIG. 5a illustrates the effect on normal light, while FIGS. 5b and 5c illustrate the effects on light incident at angles off of the normal axis of $\epsilon$ and $\phi$, respectively. Over the depicted portion of the article 310, the front surface 320 includes six pairs of first and second areas 322/324. Each pair of first and second areas 322/324 will be referred to as a front cell 326. As a result, the front surface 320 includes six front cells 326a–326f (referred to collectively as front cells 326). The back surface 330 includes only five pairs of retroreflective areas 332 and separation areas 334 (which for the purposes of this discussion will be assumed to absorb substantially all light incident on them). Each pair of retroreflective areas 332 and separation areas 334 will be referred to as a back cell 336. As a result, the back surface 330 includes five back cells 336a–336e (referred to collectively as back cells 336).

The retroreflective areas 332 on the top and bottom of the depicted article 310 are aligned with the along the normal axis 314 with the first areas 322 on the top and bottom of the depicted retroreflective article 310, with the intervening retroreflective areas 332 being misaligned with the first areas 322 on the front surface 320. For articles exhibiting a pitch mismatch ratio $\omega_1':\omega_2'$ that is closer to unity than depicted in FIGS. 5a–5c, there could be a much larger number of front and back cells 326/336 between which the first areas 322 on the front surface 320 align with the retroreflective areas 332 on the back surface 330 along the normal axis 314. For the sake of simplicity, only a 6:5 pitch mismatch is depicted in FIGS. 5a–5c to explain the principles that would also apply to much smaller mismatches in pitch, i.e., where the ratio approaches unity (e.g., a ratio of front to back cells of 1001:1000), as well as where the number of cells on the front surface is smaller than the number of cells on the back surface. Regardless, however, it will be understood that the effects described below will also apply over large areas of microstructured retroreflective articles constructed according to the principles of the present invention.

For normal light as illustrated in FIG. 5a, substantially all of the light incident on the first area 322 of the uppermost front cell 326a will be transmitted to the retroreflective area 332a and substantially all of the light incident on the first area 322 of the bottommost front cell 326f will be transmitted to the bottom retroreflective area 332e. As a result, substantially all of the normal light incident on the first areas 322a and 322f will be retroreflected.

Only a portion of the normal light incident on the first areas 322b and 322e will be transmitted to the retroreflective areas 332b and 332d (respectively) and only a portion of this light will be retroreflected back to the respective first areas. As a result, only a portion of the normal light incident on the first areas 322b and 322e will be retroreflected. Substantially none of the normal light incident on the two middle first areas 322c and 322d will be transmitted to one of the retroreflective areas 332. As a result, substantially none of the normal light incident on the first areas 322c and 322d will be retroreflected.

As seen best in FIG. 5aa, the visual effect for an observer viewing the front surface 320 of the retroreflective article 310 along its normal axis will be the appearance of two bright bands of retroreflection at the top and bottom of the article 310 corresponding to the location of front cells 326a and 326f. These bright bands of retroreflection are depicted as white (i.e., unshaded) in FIG. 5aa. Moving towards the center of the article 310, two bands of lesser brightness will appear next to both of the bright bands of retroreflection, with the areas of lesser brightness corresponding to front cells 326b and 326e. These intermediate or lesser brightness bands are cross-hatched in FIG. 5aa. In the center of the retroreflective article 310 (corresponding to the front cells 326c and 326d), the observer would view no returned light, i.e., that area of the article 310 would appear dark. The cells with no retroreflection are depicted as solid black in FIG. 5aa.

FIG. 5b illustrates the effect of the retroreflective article 310 on light incident on front surface 320 at an angle of $\epsilon$ with the normal axis 314 of the retroreflective article 310. Only a portion of the light incident on the first areas 322a, 322d, and 322f at angle $\epsilon$ will be transmitted to the retroreflective areas 332a, 332c, and 332e (respectively). As a result, only a portion of the light incident on the first areas 322a, 322d, and 322f at angle $\epsilon$ will be retroreflected. Substantially none of the light incident on the first areas 322b and 322c at angle $\epsilon$ will be transmitted to a retroreflective area 332. As a result, substantially none of the light incident on the first areas 322b and 322c at angle $\epsilon$ will be retroreflected. Substantially all of the light incident on first area 322e at angle $\epsilon$ will be transmitted to the retroreflective area 332d. As a result, substantially all of the light incident on first area 322e at angle $\epsilon$ will be retroreflected.

As seen best in FIG. 5bb, the visual effect for an observer viewing the front surface 320 of the retroreflective article 310 at an angle of $\epsilon$ relative to the normal axis 314 will be the appearance of a single bright band of retroreflection corresponding generally to the location of front cell 326e. This bright band of retroreflection is depicted as white (i.e., unshaded) in FIG. 5bb. The areas generally corresponding to front cells 326a, 326d, and 326f will appear as bands of lesser brightness relative to the fully retroreflected light from front cell 326e. These intermediate or lesser brightness bands are cross-hatched in FIG. 5bb. The front cells 326b and 326c would return substantially none of light incident on article 310 at the angle $\epsilon$ and, as a result, that area of the article 310 would appear dark to an observer viewing the article 310 at that angle. The cells with no retroreflection are depicted as solid black in FIG. 5bb.

FIG. 5c illustrates the effect of the retroreflective article 310 on light incident on front surface 320 at an angle of $\phi$ with the normal axis 314 of the retroreflective article 310, where the absolute value of $\phi$ is greater than the absolute value of angle $\epsilon$ depicted in FIG. 5b. Substantially all of the light incident at the angle $\phi$ on first area 322d will be transmitted to the retroreflective area 332c. As a result, substantially all of the light incident on first area 322d at that angle will be retroreflected. Only a portion of the light incident on the first areas 322c and 322e at angle $\phi$ will be transmitted to the retroreflective areas 332b and 332d (respectively). As a result, only a portion of the light incident on the first areas 322c and 322e at angle $\phi$ will be retroreflected. Substantially none of the light incident on the first 322a, 322b, and 322f at angle $\phi$ will be transmitted to a retroreflective area 332. As a result, substantially none of the light incident on the first areas 322a, 322b, and 322f at angle $\phi$ will be retroreflected.

As best seen in FIG. 5cc, the visual effect for an observer viewing the front surface 320 of the retroreflective article 310 at an angle of $\phi$ relative to a normal axis will be the appearance of a single bright band of retroreflection generally corresponding to the location of front cell 326d. This bright band of retroreflection is depicted as white (i.e., unshaded) in FIG. 5cc. The areas generally corresponding to front cells 326c and 326e will appear as bands of lesser brightness relative to the fully retroreflected light from front cell 326d. These intermediate or lesser brightness bands are cross-hatched in FIG. 5cc. The front cells 326a, 326b and 326f would return substantially none of the light incident on article 310 at the angle $\phi$ and, as a result, those areas of the article 310 would appear dark to an observer viewing the article 310 at that angle. The cells with no retroreflection are depicted as solid black in FIG. 5cc.

Analysis of the effects on light incident at the various angles in FIGS. 5a–5c and 5aa–5cc shows that the effect of increasing the angle of incidence (in an absolute sense) from normal, to angle $\epsilon$, and then to angle $\phi$ causes the lower band of brightness generally corresponding to front cell 326f in FIGS. 5a and 5aa to shift upwards to front cell 326e in FIGS. 5b and 5bb. That band of retroreflection shifts further upward to front cell 326d in FIGS. 5c and 5cc. That relative motion may be useful in some applications in which the areas of brightness can appear to move relative to, e.g., the driver in a vehicle moving past the retroreflective article 310 because that movement causes the angle of incidence for light from the vehicle's lights as well as the observer (i.e., driver) to move relative to the normal axis of the retroreflective article 310.

It may be helpful to provide an area 340 (see FIGS. 5aa–5cc) that is retroreflective to light approaching retroreflective article 310 from a wide range of angles (including normal light as well as light approaching at angles $\epsilon$ and $\phi$). The retroreflective area 340 can provide a frame of reference for the light retroreflected from the front cells 326. Using that frame of reference will assist observers in discerning the shifting retroreflection from the front cells 326 of the retroreflective article 310.

It will be understood that, as described herein, the width of the various features on the retroreflective articles 210 and 310 is measured substantially transverse to the axis along which the preferably columnar first and second areas, retroreflective areas, and separation areas are generally aligned.

Although the separation areas 334 in the retroreflective article 310 are described above as being absorptive, it should be understood that the separation areas may, instead, have other optical characteristics. For example, where the separation areas 334 are transmissive, the first areas 322 that transmit all or a portion of the light incident on them to the separation areas 334 may appear dark or of reduced brightness relative to the first areas 322 transmitting substantially all of the incident light to one of the retroreflective areas 332. Alternatively, the transmissive areas may allow for the viewing of a surface or image located proximate the back surface 330 of the retroreflective article 310.

In another variation, the bands of retroreflection returned from the retroreflective areas 332 through first areas 322 may be separated by bands of different colored retroreflection where the separation areas 334 include retroreflective structures that retroreflect light with one or more different optical characteristics from the light retroreflected from the retroreflective areas 332 as discussed above.

Figure 6:
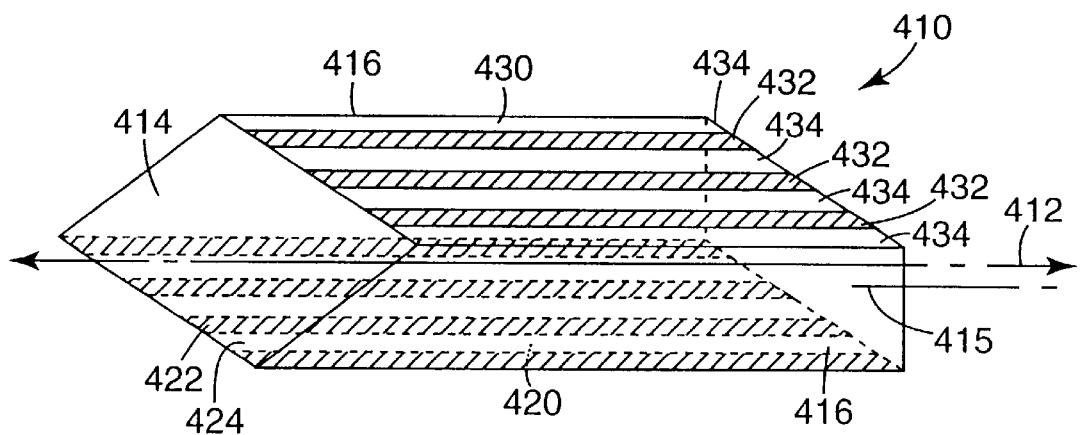
FIG. 6 is a perspective view of another retroreflective article according to the present invention.
Figure 7:
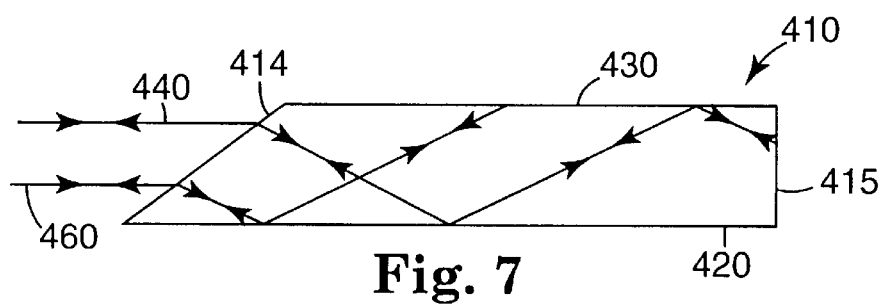
FIG. 7 is a side view the retroreflective article of FIG. 6.
Figure 8:
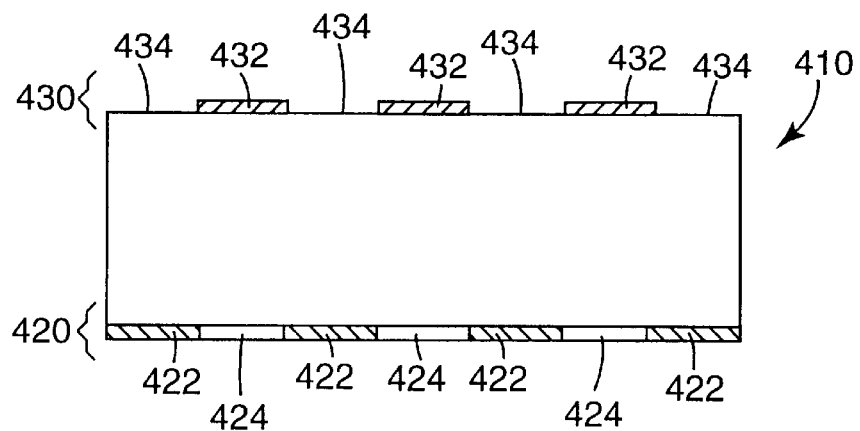
FIG. 8 is a view of the retroreflective article of FIGS. 6 and 7 taken along axis 412 in FIG. 6.

FIGS. 6–8 depict another embodiment of retroreflective articles according to the present invention. The retroreflective article 410 includes a front surface 420 and a back surface 430. The various embodiments of the present invention described above include first and second areas on their front surfaces where different transmission properties of the areas on the front surface are important to operation of the retroreflective article. The retroreflective article 410, however, relies on different reflective properties of the areas on the front surface 420 and a back surface 430 that includes retroreflective areas 432 and separation areas 434 to provide modulating retroreflection.

Light enters the retroreflective article 410 through optical window 414 which is preferably substantially transmissive. It is preferred that the front and back surfaces 420 and 430 are generally planar. It is also preferred that the front and back surfaces 420 and 430 are generally parallel to each other. Furthermore, it is preferred that the end surface 415 extend substantially between the front and back surfaces 420 and 430.

The front surface 420 includes first areas 422 that preferably substantial portions of the light incident on them and second areas 424 that reflect substantially less light incident on them than is reflected from the first areas 422. The optical properties of the first and second areas 422/424 can differ in one or more of the following: absorption, reflection, partial reflection, retroreflection, reflection angle, transmission, color, polarization, etc.

The retroreflective areas 432 preferably include a plurality of retroreflective structures, typically cube corner elements, although it will be understood that the retroreflective areas 432 could include other retroreflective structures such as retroreflective beads or spheres, conical retroreflective structures and other retroreflective structures. The separation areas 434 can provide a variety of optical effects as described below in more detail. The preferred retroreflective article 410, however, includes reflective separation areas 434.

It is preferred, but not required, that the first and second areas 422/424 are arranged in columns that are generally aligned with the axis 412. The retroreflective areas 432 and separation areas 434 on the back surface 430 are also preferably arranged in columns that are generally aligned with the axis 412.

Figure 7A:
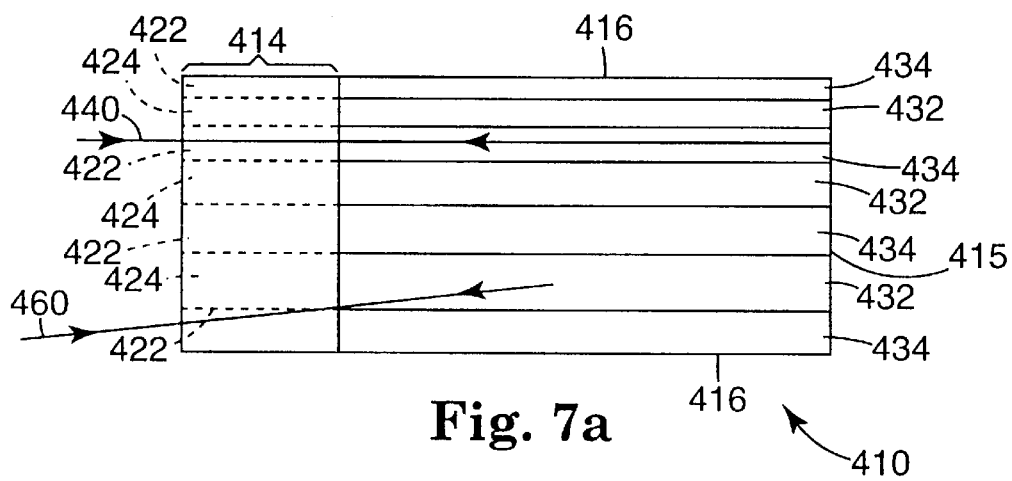
FIG. 7a is a top view of the retroreflective article of FIG. 6.

FIGS. 7 and 7a illustrate the paths of two rays of light 440 and 460 that enter retroreflective article 410 through optical window 414. In this embodiment, it is preferred that the separation areas 434 are specularly reflective.

Ray 440 enters retroreflective article 410 through optical window 414 where it is transmitted towards one of the reflective first areas 422. From the first area 422, ray 440 is specularly reflected towards one of the separation areas 434. At the separation area 434, the ray 440 is reflected (either by total internal reflection or with a reflective material) towards the end surface 415 of the retroreflective article 410.

In retroreflective article 410, end surface 415 is preferably retroreflective, i.e., it retroreflects light incident upon it. As a result, ray 440 is retroreflected from the end surface 415 back towards the separation area 434 where it is reflected back towards the first area 422 on front surface 420. At the first surface 422, ray 440 is reflected back towards optical window 414 where it is retroreflected from the retroreflective article 410.

Ray 460 enters retroreflective article 410 at point 470 on optical window 414 where it is transmitted towards one of the reflective first areas 422 on front surface 420. From the first area 422, ray 460 is specularly reflected towards one of the retroreflective areas 432 on back surface 430. As a result, ray 460 is retroreflected back towards the first area 422 on the front surface 420. At the front surface 420, ray 460 is reflected back towards the optical window 414 where it exits the retroreflective article 410 and is thus retroreflected. Because ray 460 is reflected to one of the retroreflective areas 432 on the back surface 430, it does not continue on to the end surface 415 as does ray 440. Rather, ray 460 is returned from its point of incidence on the retroreflective area 432 as seen in FIGS. 7 and 7a.

In this embodiment, it is preferred that the light retroreflected from the retroreflective areas 432 on the back surface 430 be distinguishable (to an observer) from light retroreflected from the end surface 415 of the retroreflective article 410. One example of a difference in retroreflection is a change in the brightness or intensity of the light retroreflected from the end surface 415 as compared to the light retroreflected from the retroreflective areas 432. Another example of a difference in retroreflection is a change in the color of the light retroreflected from the end surface 415 as compared to the color of light retroreflected from the retroreflective areas 432. Other variations in retroreflected light are described above with respect to the retroreflective areas and separation areas on other illustrative retroreflective articles.

Although not depicted, it will be understood that the same effect could be achieved if the separation areas 434 of the retroreflective article 410 were retroreflective in a manner that was distinguishable from the retroreflective nature of the retroreflective areas 432.

In another variation, the separation areas 434 in the retroreflective article 410 could be transmissive or absorptive, such that light incident on separation areas 434 from the front surface 420 either exits the article 410 through back surface 430 or is absorbed. The result of either transmissive or absorptive separation areas 434 is that, for light entering the article 410 through window 414, the retroreflective article 410 would exhibit retroreflection to an observer (not shown) viewing the window 414 of the retroreflective article 410 along or near to the path of the incident light only when the reflective front surface 420 reflects the incident light to the retroreflective areas 432.

Retroreflective article 410 may be particularly well-suited for use as a pavement marker, i.e., an object adapted for placement on a roadway to mark lanes, crosswalks, etc. It will, however, be understood that retroreflective articles similar to that depicted in FIGS. 6–8 may find other applications as well.

Figure 9:
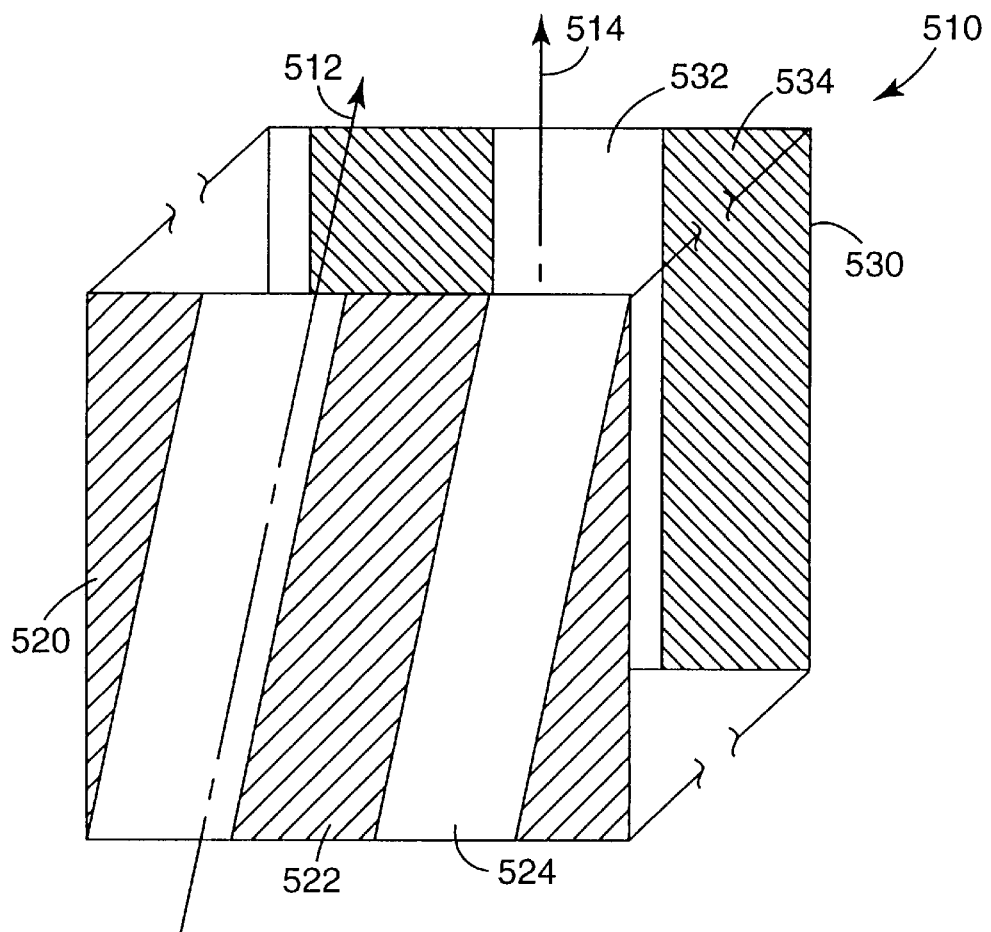
FIG. 9 is a perspective view of another retroreflective article according to the present invention.

FIG. 9 illustrates another variation in retroreflective articles according to the present invention. In the retroreflective article 510, the first areas 522 and second areas 524 on the front surface 520 lie in columns that are generally aligned along a first axis 512. The back surface 530 preferably includes retroreflective areas 532 and separation areas 534 that are located in alternating columns aligned generally with second axis 514. The first and second axes 512/514 are not parallel with each other.

The optical effects provided by orienting the first and second areas 522/524 on the front surface 520 "off-axis" with respect to the retroreflective areas 532 and separation areas 534 of the back surface 530 is that the retroreflective article 510 will exhibit areas that are retroreflective for light of a given approach angle and areas that are not retroreflective (or are retroreflective in a distinguishable manner as described above). The differences can be attributed to the transmission of light to either retroreflective areas or the separation areas depending on the relationship between the first and second areas 522/524 on the front surface 520 and the retroreflective areas and separation areas on the back surface 530.

Figure 10:
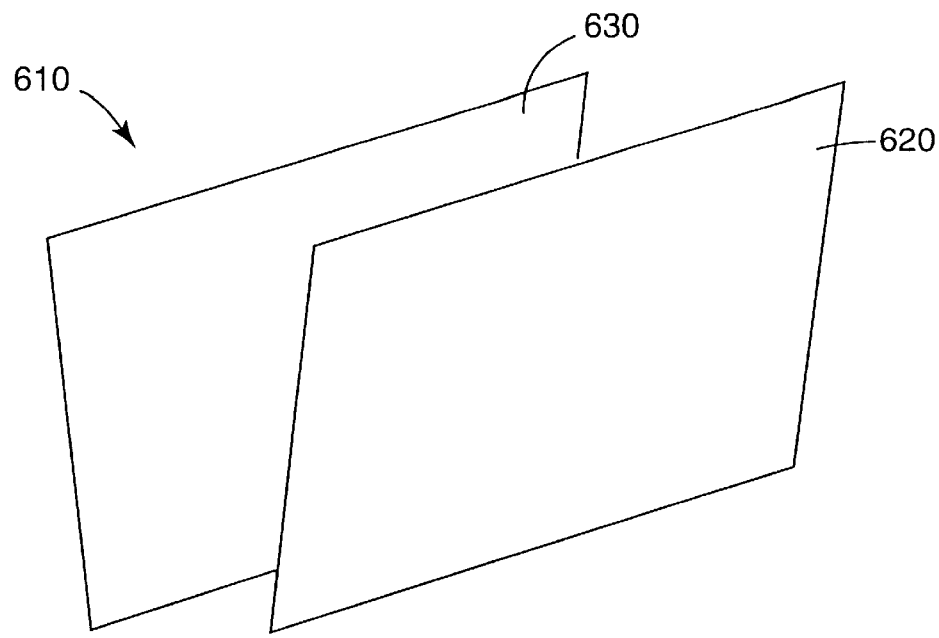
FIG. 10 is a perspective view of another retroreflective article according to the present invention.

Another variation in retroreflective articles according to the present invention is depicted in FIG. 10, where the retroreflective article 610 includes front and back surfaces 620 and 630 that are not parallel to each other. The optical effect of orienting the front and back surfaces 620 and 630 in a non-parallel arrangement is that the pattern retroreflected from the front surface 620 of the retroreflective article 610 will appear as moire effect. If the pitch of the various areas on both the front and back surfaces 620 and 630 are equal, then the observed light would revert back to on/off retroreflective flashing when the front and back surfaces 620 and 630 were oriented parallel to each other (assuming that the light incident on the separation areas was not returned to a viewer located along a path on or near the path of the incident light).

The non-parallel orientation between the first and back surfaces could be accomplished using one or two separate bodies. If the surfaces 620 and 630 were located on one unitary body, e.g., a sheet, then deflection of the sheet from a planar status could effect a change in the retroreflection pattern. This effect could be useful in connection with, e.g., alignment mechanisms, temperature sensing, pressure sensing, and other situations in which deflection could be an indication of a change in some physical property.

Figure 11:
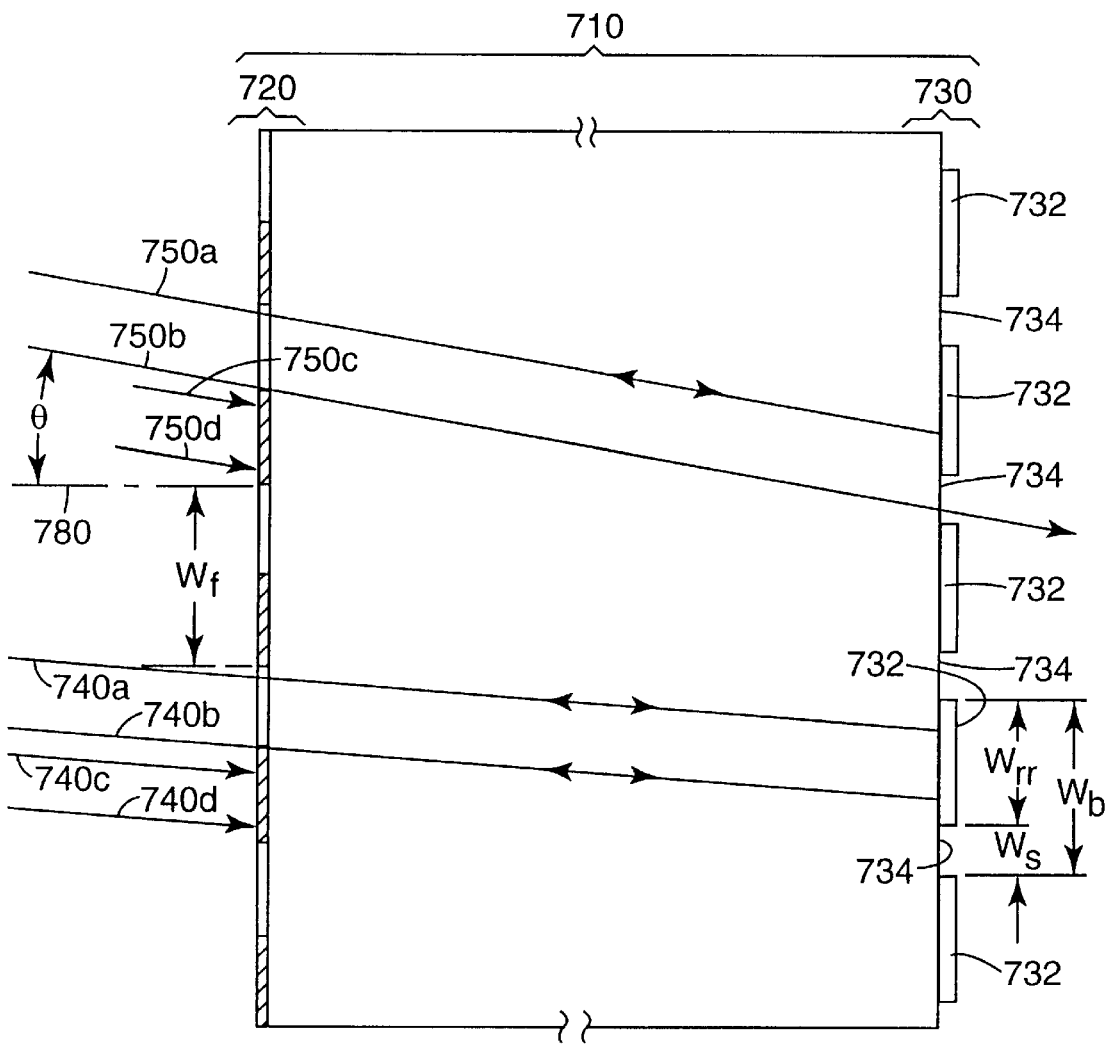
FIG. 11 is a cross-sectional view of another retroreflective article according to the present invention.

FIG. 11 depicts yet another retroreflective article 710 according to the present invention in which the relative widths of the retroreflective areas 732 and the separation areas 734 can have an effect on the optical performance of the retroreflective article 710. The width of the retroreflective areas and separation areas of the retroreflective articles thus far described have been substantially equal. In retroreflective article 710, the width $\omega_{rr}$ of the retroreflective areas 732 is greater than the width $\omega_s$ of the separation areas 734, i.e., the retroreflective areas 732 occupy more of the surface area of the back surface 730 than the separation areas 734. For the purposes of this discussion, the width, $\omega_f$, of a pair of adjacent first and second areas 722/724 on the front surface 720 is substantially equal to the width $\omega_b$ of an adjacent pair of one retroreflective area 732 and a separation area 734.

FIG. 11 includes a first set of rays 740a, 740b, 740c, and 740d (collectively referred to as "rays 740"), all of which approach the front surface 720 of the retroreflective article 710 parallel to the normal axis 780. Rays 740a and 740b are transmitted through one of the transmissive first areas 722 to one of the retroreflective areas 732 on the back surface 730 of the retroreflective article 710. As a result, rays 740a and 740b are retroreflected on substantially the same path along which they entered the article 710. Along this approach angle, the optical performance of the retroreflective article 710 is similar to many of the retroreflective articles described above. Rays 740c and 740d are incident on one of the second areas 724 where they are, in this embodiment, absorbed.

A second set of rays 750a, 750b, 750c, and 750d (collectively referred to as "rays 750") are also depicted in FIG. 11 and approach the front surface 720 of retroreflective article 710 at an angle θ with respect to the normal axis 780 of retroreflective article 710. Rays 750a and 750b enter the retroreflective article 710 through one of the transmissive first areas 722 at the same angle, but they are not both transmitted to a retroreflective area 732. Instead, ray 750a is transmitted to the retroreflective area 732 as depicted in FIG. 11 while ray 750b is transmitted to the separation area 734 and transmitted out of the retroreflective article 710. Rays 750c and 750d are incident on one of the second areas 724 where they are absorbed. As a result, a reduced amount of the light incident on the front surface 720 of the retroreflective article 710 at angle θ will be retroreflected.

Figure 12:
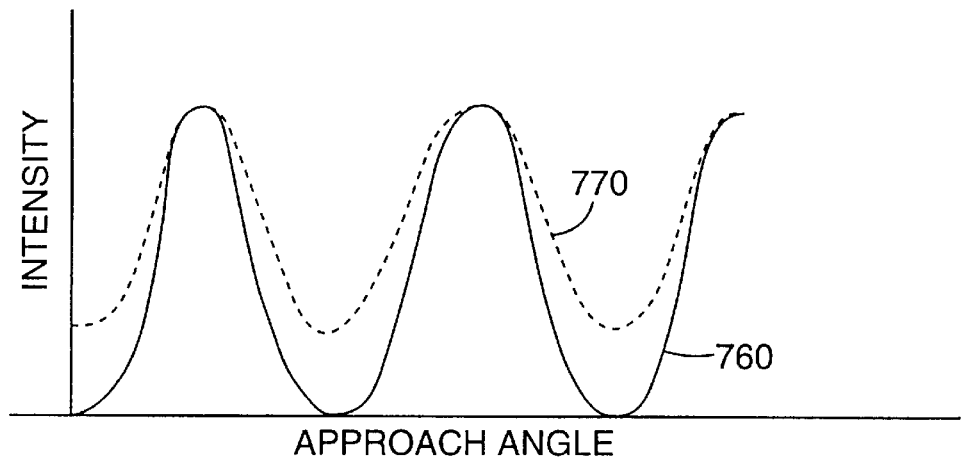
FIG. 12 is a graphical representation of the optical performance of retroreflective articles according to the present invention.

The effect of varying the percentage of the back surface occupied by retroreflective areas as compared to separation areas is graphically illustrated in FIG. 12. For the purposes of comparison, it will be assumed that light transmitted to one of the separation areas is absorbed, transmitted, or otherwise affected such that it is not returned to an observer located on or near the path along which the light incident on the retroreflective article. The horizontal axis in FIG. 12 is representative of various approach angles for the incident light while the vertical axis is indicative of the intensity of the returned light.

Line 760 in FIG. 12 represents the optical performance of a retroreflective article in which the retroreflective areas are substantially equal in width to the separation areas and in which the pitch of the pattern of areas on the front surface of the retroreflective article is substantially equal to the pitch of the retroreflective areas and separation areas on the back surface. The intensity of the light returned along the path of the incident light (i.e., retroreflected) is represented by line 760 and varies regularly from a maximum to zero as the approach angle of the incident light changes.

Broken line 770 in FIG. 12 represents the optical performance of retroreflective article 710 in which the retroreflective areas are three times as wide as the separation areas. The result on the intensity of the incident light retroreflected from the article 710 over a range of approach angles varies. As a result, the retroreflective article 710 would not appear to flash on and off as the incident light and an associated observer approached the retroreflective article 710 at a changing angle (e.g., a driver approaching the retroreflective article 710 not along its normal axis). The retroreflective article 710 would, instead, appear to modulate, pulsate or vary in intensity or brightness as the approach angle varied over the range of angles depicted in FIG. 12.

FIGS. 11 and 12 can also be used to discuss another feature of the retroreflective articles according to the present invention, i.e., the ability to vary the flash rate of the retroreflective articles. Where all other variables are equal between two retroreflective articles according to the present invention, the retroreflective article that has a larger spacing between the front and back surfaces will exhibit a higher flash rate. By higher flash rate, we mean that the intensity of the light returned from a "thicker" retroreflective article will reach the maximum value more often over a given range of approach angles. With reference to FIG. 12, the peaks in lines 760 or 770 will be spaced closer for a thicker retroreflective article. Thickness of a retroreflective article for these purposes is defined as the distance between the front surface and the back surface and thus applies to retroreflective articles that are encompassed by a single body, as well as those in which the first and back surfaces are provided on separate bodies.

Figure 13:
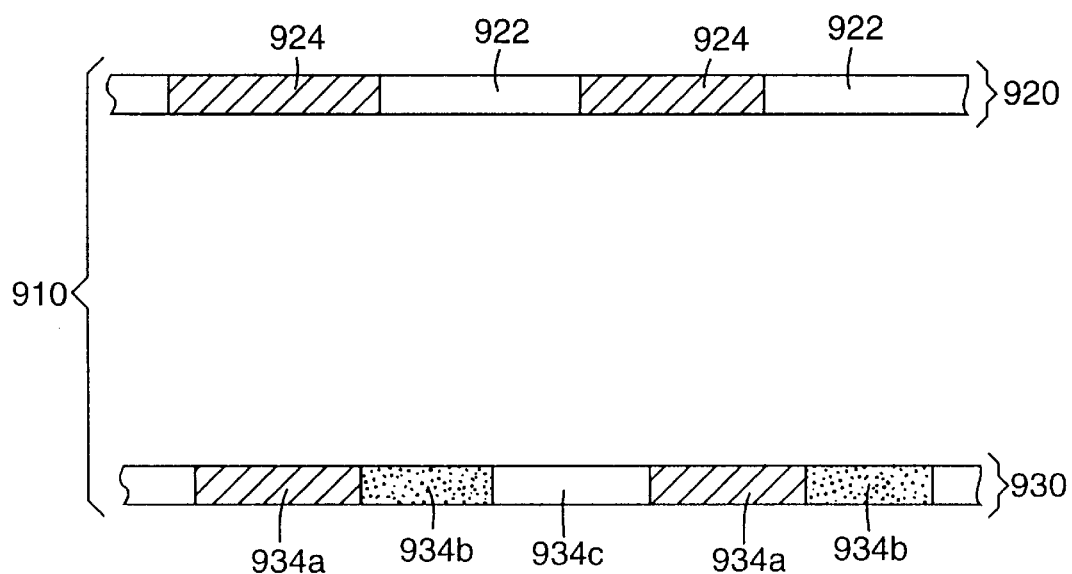
FIG. 13 is a cross-sectional view of another retroreflective article according to the present invention.

FIG. 13 depicts another embodiment of a retroreflective article 910 according to the present invention in which the front surface 920 includes transmissive first areas 922 and second areas 924 that transmit light having at least one different property, e.g., the second areas 924 are absorptive, reflective, etc. Another feature of the retroreflective article 910 is that the back surface 930 includes more than two different areas that exhibit more than two different optical properties. As illustrated, the retroreflective article 910 includes three different retroreflective areas 934a, 934b, and 934c (collectively referred to as retroreflective areas 934). The different retroreflective areas 934 preferably exhibit different optical characteristics such as different colors, different intensities, etc. Preferably, but not necessarily, the retroreflective areas 934 are provided in a repeating array across the back surface 930. It will be understood that more than three different retroreflective areas 934 could be provided and that the back surface 930 could also include areas that are transmissive, absorptive, or reflective (specularly or diffusely) in combination with one or more different retroreflective areas.

As light transmitted through the transmissive first areas 922 changes direction in response to changing approach angles, the light will strike different retroreflective areas 934 on the back surface 930, thereby providing different optical effects based on the optical characteristics of the retroreflective area or areas 934 on which the light is incident.

It will be understood that the retroreflective articles according to the present invention can take the form of sheeting, films, and bodies having a rigidity not otherwise associated with sheetings or films.

Retroreflective articles according to the present invention can be manufactured by replication using molds formed by many different methods, including those typically referred to as pin bundling and direct machining. Molds manufactured using pin bundling are made by assembling together individual pins, each of which have an end portion shaped with the desired features of the retroreflective article. Examples of pin bundling are described in, e.g., U.S. Pat. No. 3,926,402 to Heenan et al., and United Kingdom Patent Nos. 423,464 and 441,319 to Leray. The direct machining technique, sometimes referred to as ruling, involves cutting portions of a substrate to create a pattern of grooves that intersect to form retroreflective structures. Examples of such ruling, shaping and milling techniques are described in U.S. Pat. Nos. 3,712,706 (Stamm); 4,349,598 (White); 4,588,258 (Hoopman); 4,895,428 (Nelson et al.); 4,938,563 (Nelson et al.). Although the retroreflective articles of the present invention described herein will generally be manufactured from molds formed by direct machining, it will be understood that any other suitable methods could be used.

Figure 14:
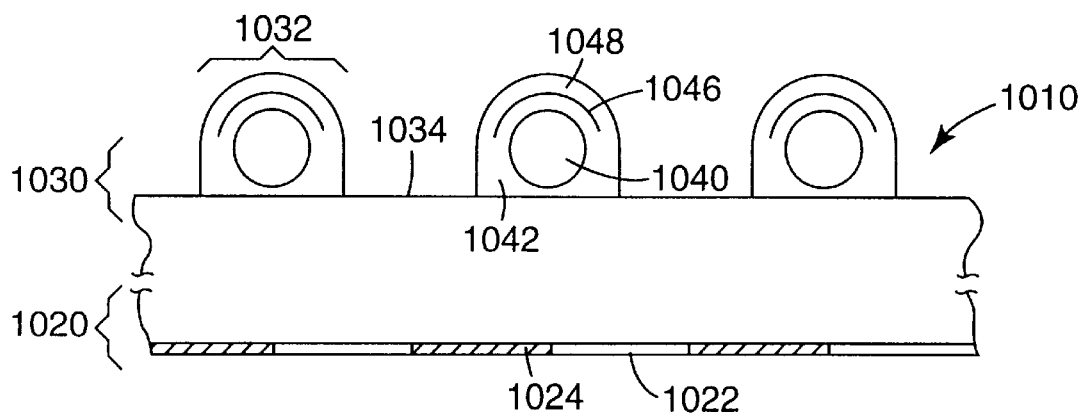
FIG. 14 is a cross-sectional view of another retroreflective article according to the present invention.

Because of the sensitivity of the retroreflective articles to variations in pitch between the front and back surfaces, one method of manufacturing a retroreflective article 1010 (see FIG. 14) according to the present invention will be described. The retroreflective article 1010 includes a front surface 1020 including different areas such as first and second areas 1022 and 1024 as described above. The back surface 1030 of the retroreflective articles 1010 includes a plurality of retroreflective areas 1032 and separation areas 1034.

The retroreflective areas 1032 of the retroreflective article 1010 each include a plurality of retroreflective beads 1040 located in a binder 1042 that is bonded in place on the retroreflective article 1010. The beads 1040 may also be partially encapsulated by a spacer coat 1046 and reflective material 1048 as is well known to those skilled in the art. The binder 1042 is preferably cured by the use of light energy, e.g., ultraviolet light, as is well known. As a result, the retroreflective areas can be formed with the proper pitch using light energy in the process described below. One method of manufacturing the retroreflective article 1010 will now be described.

Figure 15:
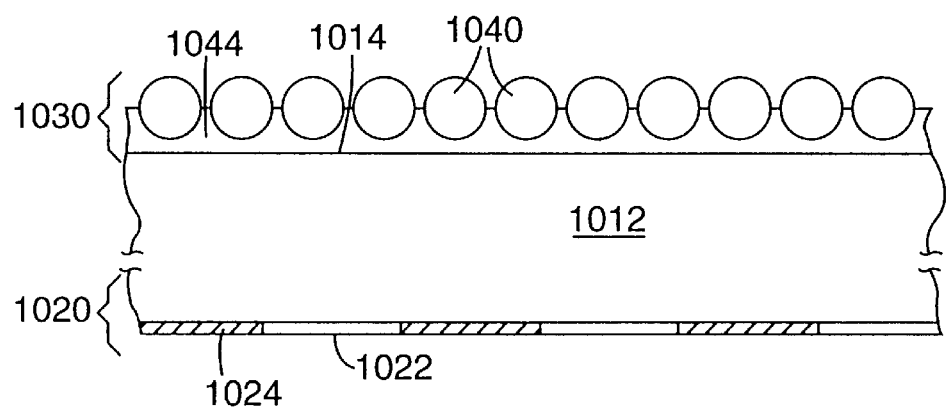
FIG. 15 is a cross-sectional view of the retroreflective article of FIG. 14 during manufacturing.

The front surface 1020 could be formed in a suitable body 1012 such as a sheet or film in which the opposing surface 1014 was preferably smooth, i.e., planar. The opposing surface 1014 would then be coated over substantially its entire surface with a mixture of retroreflective beads 1040 and binder solution 1044 (see FIG. 15). Light energy with the appropriate wavelength(s) required to cure the binder solution would then be directed at the front surface 1020 such that the light energy is transmitted through the body 1012 to the retroreflective areas 1032 on the finished retroreflective article 1010 (see FIG. 14).

In those areas where the light energy is incident on the binder solution 1044, the retroreflective beads 1040 will be retained in the cured binder 1042. In those areas where the light is not incident on the binder solution 1044, the beads 1040 and binder solution can be removed after the retroreflective areas 1032 have been cured. Application of any spacer coats and reflective materials can be accomplished by any suitable method.

One significant advantage to this method is that the angle of the light energy used to cure the binder 1042 can be controlled, resulting in accurate formation of the retroreflective areas 1032 and separation areas 1034 relative to the position of the first and second areas 1022/1024 on the front surface 1020 of the retroreflective article 1010 for that angle of incident light. The result is that exposures at different angles can be used to create the desired retroreflective properties in the retroreflective article 1010.

Figure 16:
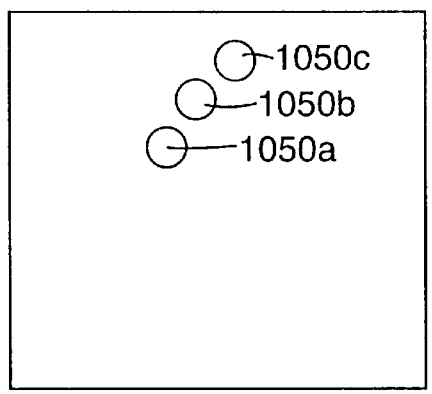
FIG. 16 is plan view of the front surface of the retroreflective article of FIG. 14.

In addition to exposures at different angles, it may be advantageous to mask the front surface 1020 before exposure to create visual images in the retroreflected light at the various angles. For example, a bubble could appear to move from the bottom of the retroreflective article 1010 towards its top as illustrated in FIG. 16. The incident light is presented at a first angle relative to the normal axis of the article 1010 corresponding the first angle at which the retroreflective article 1010 was exposed during manufacturing. The bubble 1050*a* would appear in the light retroreflected from the retroreflective article 1010. When the incident light approached article 1010 along the normal axis, light could be retroreflected from an image of the bubble 1050*b* (while light would not be retroreflected from the first bubble 1050*a*). As the approach angle of the light continued to change, light would then be retroreflected from a third image of a bubble 1050*c* near the top of the article 1010 (while bubbles 1050*a* and 1050*b* were not visible). In other words, each of the bubbles 1050 would appear in light approaching the article 1010 at a different angle that would generally correspond to the angle at which the article 1010 was exposed during manufacturing. Many variations of this concept will be apparent based on the above description.

The retroreflective articles according to the present invention can be provided in macro- or micro-structured form (or a combination of both) and will typically exhibit the retroreflective properties discussed above in any form. Macro-structured articles can be provided from many different materials and in any appropriate dimensions depending on the intended application or use of the articles. Micro-structured articles will typically include small optical elements such as first areas, second areas, cube corners, facets, etc., sized such that the pitch of the features on the front surface of the retroreflective articles and the pitch of the features on the back surface of the retroreflective articles is about 0.03 inches (0.75 millimeters) or less, although in some instances it may be preferable to provide retroreflective articles in which the pitch of the features on the first and back surfaces is about 0.01 inches (0.25 millimeters) or less, and even more preferably about 0.005 inches (0.13) millimeters) or less. It may further be advantageous to use thin micro-structured sheeting incorporating the structures described above in some situations. The thin micro-structured sheeting may more preferably be flexible as described in, for example, U.S. Pat. No. 4,906,070 (Cobb, Jr.).

Suitable materials for retroreflective articles according to the present invention can vary, although the articles will typically be manufactured from transparent materials that are dimensionally stable, durable, weatherable, and easily replicated in the desired configuration. Examples of suitable materials include glass, acrylics with an index of refraction of about 1.49 (e.g., PLEXIGLASS brand resin from Rohm & Haas Company), polycarbonates with an index of refraction of about 1.59, polyethylene based ionomers (e.g., SUR- LYN brand from E.I. DuPont de Nemours and Co., Inc.), polyesters, polyurethanes, and cellulose acetate butyrates. Other examples include reactive materials such as those taught in U.S. Pat. Nos. 4,576,850; 4,582,885; and 4,668,558.

The inventive retroreflective articles may be constructed according to the principles of U.S. Pat. No. 5,450,235 where the cube-corner elements are made of a high modulus polymer and an overlapping body layer is made of a softer lower modulus polymer. Such a construction would also allow the inventive articles to be employed on articles of clothing as discussed below.

Polycarbonates may be used because of their toughness, temperature stability, and relatively higher refractive index (about 1.59) which generally contributes to improved retroreflective performance over a wider range of entrance angles when using back surface reflectors. The higher index of refraction provides a larger index of refraction difference to enhance total internal reflection at interfaces with materials having lower indexes of refraction, e.g., air. In some instances where transmission of light through the retroreflective article, using, e.g., separation areas or truncated structures, it may be desirable to use materials with lower indices of refraction to improve the range of light transmitted through the article. For example, where transmission is important, acrylics (with an index of refraction of about 1.49) may offer an advantageous combination of properties. The materials used to form retroreflective articles may also include UV stabilizers or other additives to improve their weatherability, durability, toughness or any other desired property.

Where necessary, the retroreflective article according to the present invention may include a reflective coating as needed to enhance their reflective properties. Such coatings could include a metal or a dielectric stack.

Where colors are to be employed in retroreflective articles according to the present invention, any suitable coloring agent or agents may be used. The term "coloring agent" will be used herein to refer to any dye, colorant, pigment, etc. used to effect a visible color change in light exiting from the retroreflective articles according to the present invention.

The retroreflective articles according to the present invention may be applied to a variety of substrates using mechanical methods such as sewing. In some applications, however, it may be desirable to secure the article to a substrate using adhesives, e.g., a pressure-sensitive adhesive, heat-activatable adhesive, or an ultraviolet radiation activated adhesive. The substrate bearing the retroreflective article can be located on the outer surface of an article of clothing, enabling the retroreflective article to be displayed when the clothing is worn in its normal orientation on a person. The substrate may be, for example, a woven, knit or nonwoven fabric containing cotton, wool, flax, nylon, olefin, polyester, cellulose, rayon, urethane, vinyl, acrylic, rubber, spandex, and the like, or it could be made of leather or paper.

Figure 17:
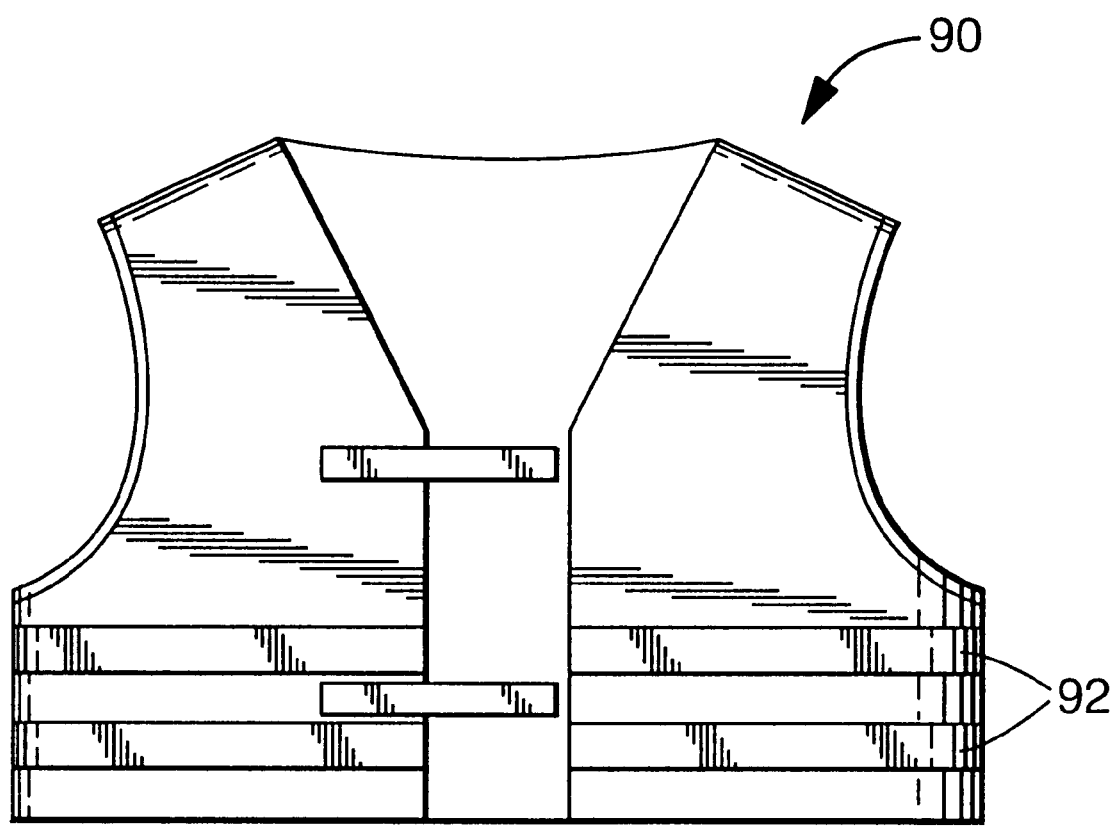
FIG. 17 illustrates an article of clothing including a retroreflective article according to the present invention.

FIG. 17 illustrates a safety vest 90 displaying a retroreflective article 92 in the form of an elongated sheeting or strip. Safety vests are often worn by road construction workers and police officers to improve their visibility to oncoming motorists. Although a safety vest has been chosen for this illustration, articles of clothing including retroreflective articles according to the present invention may be provided in a variety of forms. As used herein, "article of clothing" means an item of wearing apparel sized and configured to be worn or carried by a person. Other examples of articles of clothing that may display retroreflective articles of the invention include shirts sweaters, jackets (e.g., fireman's jackets), coats, pants, shoes, socks, gloves, belts, hats, suits, one-piece body garments, bags, backpacks, etc.

The patents, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A retroreflective article comprising:

a front surface comprising a plurality of first areas and a plurality of second areas, wherein the plurality of first areas transmit light with one or more different properties from the light transmitted by the plurality of second areas;

a back surface opposite the front surface, the back surface comprising a plurality of retroreflective areas and a plurality of separation areas, wherein the plurality of retroreflective areas are separated from each other by the separation areas;

wherein the first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface, and further wherein a substantial portion of light incident on the first areas of the front surface at a second angle is transmitted through the first areas on the front surface to the separation areas.

2. An article according to claim 1, wherein, for light incident on the front surface at the first angle, the plurality of first areas are substantially transmissive and further wherein each of the plurality of second areas exhibits one or more optical properties selected from the group of: substantially absorptive, partially absorptive, diffusely transmissive, partially transmissive, diffusely reflective, specularly reflective, and retroreflective.

3. An article according to claim 1, wherein the first and second areas on the front surface exhibit different colors.

4. An article according to claim 1, wherein, for light transmitted through the front surface, each of the plurality of separation areas on the back surface exhibit one or more optical properties selected from the group of absorption and transmission.

5. An article according to claim 1, wherein each of the plurality of separation areas is retroreflective, and further wherein at least one optical characteristic of light retroreflected from the separation areas is different than light retroreflected from the retroreflective areas on the back surface of the article.

6. An article according to claim 1, wherein the retroreflective areas and the separation areas are arranged in alternating columns on the back surface, the columns being generally aligned with a first axis and having a width generally transverse to the first axis.

7. An article according to claim 6, wherein the retroreflective areas and the separation areas on the back surface are provided in a repeating pattern.

8. An article according to claim 7, wherein the width of each of the plurality of retroreflective areas is substantially equal to the width of each of the plurality of separation areas.

9. An article according to claim 6, wherein the first and second areas on the front surface are arranged in alternating columns generally aligned with the first axis, each of the first and second areas having a width generally transverse to the first axis.

10. An article according to claim 9, wherein the first and second areas on the front surface are provided in a repeating pattern.

11. An article according to claim 10, wherein the width of each of the plurality of first areas is substantially equal to the width of each of the plurality of second areas.

12. An article according to claim 10, wherein the pitch of the retroreflective areas and the separation areas on the back surface is substantially equal to the pitch of the first and second areas on the front surface.

13. An article according to claim 9, wherein the front and back surfaces are generally planar.

14. An article according to claim 13, wherein the front and back surfaces are generally parallel to each other.

15. A retroreflective article comprising:

a front surface comprising a plurality of first areas and a plurality of second areas, wherein the plurality of first areas transmit light with one or more different properties from the light transmitted by the plurality of second areas, and further wherein the first and second areas on the front surface are arranged in alternating columns generally aligned with a first axis, and still further wherein, for light incident on the front surface at a first angle, the plurality of first areas are substantially transmissive and each of the plurality of second areas exhibits one or more optical properties selected from the group of: substantially absorptive, partially absorptive, diffusely transmissive, partially transmissive, diffusely reflective, specularly reflective, and retroreflective;

a back surface opposite the front surface, the back surface comprising a plurality of retroreflective areas and a plurality of separation areas, wherein the retroreflective areas and the separation areas are arranged in alternating columns on the back surface, the columns being generally aligned with the first axis and having a width generally transverse to the first axis, and further wherein, for light transmitted through the front surface, each of the plurality of separation areas on the back surface exhibit one or more optical properties selected from the group of absorption, transmission, and retroreflection wherein at least one optical characteristic of light retroreflected from the separation areas is different than light retroreflected from the retroreflective areas on the back surface of the article; and wherein the first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface, and further wherein a substantial portion of light incident on the first areas of the front surface at a second angle is transmitted through the first areas on the front surface to the separation areas.

16. An article according to claim 15, wherein the retroreflective areas and the separation areas on the back surface are provided in a repeating pattern.

17. An article according to claim 16, wherein the width of each of the plurality of retroreflective areas is substantially equal to the width of each of the plurality of separation areas.

18. An article according to claim 15, wherein the first and second areas on the front surface are provided in a repeating pattern.

19. An article according to claim 18, wherein the width of each of the plurality of first areas is substantially equal to the width of each of the plurality of second areas.

20. An article according to claim 15, wherein the pitch of the retroreflective areas and the separation areas on the back surface is substantially equal to the pitch of the first and second areas on the front surface.

21. An article according to claim 15, wherein the front and back surfaces are generally planar.

22. An article according to claim 21, wherein the front and back surfaces are generally parallel to each other.

23. A method of manufacturing a retroreflective article comprising steps of:

providing a front surface comprising a plurality of first areas and a plurality of second areas, wherein the plurality of first areas transmit light with one or more different properties from the light transmitted by the plurality of second areas;

providing a back surface opposite the front surface, the back surface being separated from the front surface by an optically transmissive medium;

providing a light curable binder solution on the back surface;

providing a plurality of retroreflective elements proximate the back surface, each of the plurality of retroreflective elements at least partially immersed in the binder solution;

forming retroreflective areas on the back surface by directing light energy through the front surface to cure selected areas of the binder solution on the back surface, wherein the binder solution in the selected areas is sufficiently cured to retain a substantial portion of the retroreflective elements; and removing the retroreflective elements from the uncured binder solution on the back surface to form separation areas between the retroreflective areas;

wherein the first and second areas on the front surface are arranged relative to the retroreflective areas and the separation areas on the back surface such that a substantial portion of light incident on the first areas of the front surface at a first angle is transmitted through the first areas of the front surface to the retroreflective areas on the back surface where it is retroreflected back through the front surface, and further wherein a substantial portion of light incident on the first areas of the front surface at a second angle is transmitted through the first areas on the front surface to the separation areas.

24. A method according to claim 23, further comprising providing the retroreflective areas and the separation areas on the back surface in a repeating pattern.

25. A method according to claim 24, further comprising forming the width of each of the plurality of retroreflective areas substantially equal to the width of each of the plurality of separation areas.

26. A method according to claim 23, further comprising providing the first and second areas on the front surface in a repeating pattern.

27. A method according to claim 26, further comprising providing the width of each of the plurality of first areas substantially equal to the width of each of the plurality of second areas.

28. A method according to claim 23, further comprising forming the retroreflective areas and the separation areas on the back surface with a pitch that is substantially equal to the pitch of the first and second areas on the front surface.

29. An article of clothing comprising the retroreflective article of claim 1, the retroreflective article being secured to the article of clothing.

30. An article of clothing comprising the retroreflective article of claim 15, the retroreflective article being secured to the article of clothing.

* * * * *